US008990794B2

(12) United States Patent
Poddar et al.

(10) Patent No.: US 8,990,794 B2
(45) Date of Patent: *Mar. 24, 2015

(54) PORTING VIRTUAL IMAGES BETWEEN PLATFORMS

(75) Inventors: Indrajit Poddar, Pittsburgh, PA (US); Yulia Gaponenko, Moscow (RU); Alexey Miroshkin, Moscow (RU); Vladislav Ponomarev, Moscow (RU); Igor Sukharev, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,156

(22) Filed: Mar. 8, 2012

(65) Prior Publication Data

US 2012/0180035 A1    Jul. 12, 2012

Related U.S. Application Data

(63) Continuation of application No. 12/651,277, filed on Dec. 31, 2009.

(51) Int. Cl.
    G06F 9/44    (2006.01)
    G06F 9/455   (2006.01)

(52) U.S. Cl.
    CPC .................................. G06F 9/455 (2013.01)
    USPC ......................................................... 717/173

(58) Field of Classification Search
    CPC ..................................................... G06F 9/455
    USPC ......................................... 717/168, 171–173
    See application file for complete search history.

(56) References Cited

U.S. PATENT DOCUMENTS

| 5,848,415 | A  | 12/1998 | Guck |
| 6,058,397 | A  | 5/2000  | Barrus et al. |
| 6,714,980 | B1 | 3/2004  | Markson et al. |
| 6,760,804 | B1 | 7/2004  | Hunt et al. |
| 6,792,615 | B1 | 9/2004  | Rowe et al. .................... 725/37 |

(Continued)

FOREIGN PATENT DOCUMENTS

| CN | 101430649    | 5/2009 |
| JP | 2001051834 A | 2/2001 |

(Continued)

OTHER PUBLICATIONS

Anderton, "Creating a new EC2 AMI from within VMware or from VMDK files," The WebFellas Blog, Sep. 1, 2008, 15 pages.
International Search Report and Written Opinion for International Application No. PCT/EP2010/069569, mailed Mar. 31, 2011, 9 pages.
Krsul et al., "VMPlants: Providing and Managing Virtual Machine Execution Environments for Grid Computing," University of Florida, Supercomputing 2004, Proceedings of the ACM/IEEE SC2004 Conference, Pittsburgh, PA, Nov. 6-12, 2004, 12 pages.

(Continued)

*Primary Examiner* — Michael Hicks
*Assistant Examiner* — Matthew Ellis
(74) *Attorney, Agent, or Firm* — Van Leeuwen & Van Leeuwen; William J. Stock

(57) ABSTRACT

In an embodiment, an approach is provided that differences a source topology model associated with a source platform and a target topology model associated with a target platform. This differencing is performed by a processor and results in a topology difference. An operation in a workflow model is obtained from an asset library, the operation being associated with the topology difference. At least a portion of the asset library is stored in a persistent storage medium. The operation to deploy a portion of a solution is transmitted for deployment. The deployed portion of the solution includes a target image compatible with the target platform.

23 Claims, 16 Drawing Sheets

(56) References Cited

U.S. PATENT DOCUMENTS

| | | | |
|---|---|---|---|
| 7,002,976 | B2 | 2/2006 | Dupont |
| 7,006,494 | B1 | 2/2006 | Tighe et al. |
| 7,080,378 | B1 | 7/2006 | Noland et al. ............... 718/104 |
| 7,092,958 | B2 | 8/2006 | Hempstead et al. |
| 7,184,789 | B2 | 2/2007 | Leung et al. ................. 455/519 |
| 7,209,921 | B2* | 4/2007 | Pace et al. ............................. 1/1 |
| 7,227,837 | B1 | 6/2007 | Bi et al. |
| 7,283,533 | B1 | 10/2007 | Kumar et al. |
| 7,356,679 | B1 | 4/2008 | Le et al. ............................ 713/1 |
| 7,363,654 | B1 | 4/2008 | Yamada |
| 7,383,327 | B1 | 6/2008 | Tormasov et al. |
| 7,440,894 | B2 | 10/2008 | Zhou et al. |
| 7,577,722 | B1 | 8/2009 | Khandekar et al. |
| 7,587,570 | B2 | 9/2009 | Sarkar et al. |
| 7,633,955 | B1 | 12/2009 | Saraiya et al. |
| 7,865,663 | B1 | 1/2011 | Nelson et al. |
| 8,078,728 | B1* | 12/2011 | Pollan et al. .................. 709/226 |
| 8,230,500 | B1* | 7/2012 | Spertus et al. ................... 726/22 |
| 8,271,536 | B2* | 9/2012 | Amradkar et al. ............ 707/802 |
| 8,352,415 | B2 | 1/2013 | Gaponenko et al. |
| 2002/0069278 | A1* | 6/2002 | Forslow ........................ 709/225 |
| 2003/0037184 | A1 | 2/2003 | Day et al. |
| 2004/0039815 | A1* | 2/2004 | Evans et al. ................... 709/225 |
| 2004/0059829 | A1 | 3/2004 | Chu et al. |
| 2006/0101116 | A1 | 5/2006 | Rittman et al. |
| 2006/0168183 | A1* | 7/2006 | Fuller et al. ................... 709/223 |
| 2007/0010796 | A1 | 1/2007 | Moran et al. |
| 2008/0080526 | A1 | 4/2008 | Gounares et al. ............. 370/401 |
| 2008/0307407 | A1* | 12/2008 | Wagner et al. ................ 717/172 |
| 2009/0013092 | A1 | 1/2009 | Pao et al. |
| 2009/0150802 | A1 | 6/2009 | Do et al. |
| 2009/0282404 | A1 | 11/2009 | Khandekar et al. ............... 718/1 |
| 2009/0307447 | A1* | 12/2009 | Jacobs et al. .................. 711/162 |
| 2010/0043046 | A1 | 2/2010 | Sen et al. |
| 2010/0306355 | A1 | 12/2010 | Lagergren et al. |
| 2010/0306772 | A1* | 12/2010 | Arnold et al. ...................... 718/1 |
| 2011/0016214 | A1* | 1/2011 | Jackson ......................... 709/226 |
| 2011/0131573 | A1 | 6/2011 | Antony |
| 2011/0153515 | A1 | 6/2011 | Pitzo |
| 2011/0313982 | A1 | 12/2011 | Kranendonk et al. |
| 2012/0140772 | A1 | 6/2012 | Chu et al. |

FOREIGN PATENT DOCUMENTS

| | | |
|---|---|---|
| JP | 2006196014 A | 7/2006 |
| WO | 2005088539 | 9/2005 |

OTHER PUBLICATIONS

Bhatia et al., "Virtual Cluster Management with Xen," Oak Ridge National Laboratories, Aug. 28, 2007, Euro-Par 2007 Workshops: Parallel Processing, 10 pages.

Wolfe, "Microsoft Seeks Patent for Cloud Data Migration," Wolfe's Den Blog, Information Week, http://www.informationweek.com/blog/main/archives/2009/11/microsoft_seeks_1.html;jsessionid=QFHC33C20J2NZQE1GHPCKH4ATMY32JVN, Nov. 30, 2009, 4 pages.

Konstantinou et al., "An Architecture for Virtual Solution Composition and Deployment in Infrastructure Clouds," VTDC'09, Jun. 15, 2009, Barcelona, Spain, ACM 978-1-60558-580-2/09/06, 9 pages.

Datta et al., "Image Retrieval: Ideas, Influences, and Trends of the New Age," ACM Computing Surveys, vol. 40, No. 2, Apr. 2008, 60 pages.

Matthews et al., "Virtual Machine Contracts for Datacenter and Cloud Computing Environments," ACDC'09, Jun. 19, 2009, Barcelona, Spain, ACM 978-1-60558-585-7/09/06, pp. 25-30.

Kamoun, "Virtualizing the Datacenter Without Compromising Server Performance," ACM Ubiquity, vol. 2009, Issue 9, Aug. 17, 2009, 12 pages.

Tan et al., "Image Management in a Virtualized Datacenter," University of Calgary, 2008-2009, pp. 4-9.

Hines et al., "Post-Copy Based Live Virtual Machine Migration Using Adaptive Pre-Paging and Dynamic Self-Ballooning," State University of New York at Binghamton, VEE'09, Mar. 2009, pp. 51-60.

Kroeker, "The Evolution of Virtualization," Communications of the ACM, vol. 52, No. 3, Mar. 2009, pp. 18-20.

Tip et al., "Practical Extraction Techniques for Java", ACM Transactions on Programming Languages and Systems, vol. 24, No. 6, Nov. 2002, pp. 625-666.

Hartel, "Formalizing the Safety of Java, the Java Virtual machine, and Java Card", ACM Computing Surveys, vol. 33, No. 4, Dec. 2001, pp. 517-558.

"Method and Practice for Achieving High Availability of Virtual Machines Based on Normalized Image Formats and Mobility Protocols", IBM Technical Disclosure, Mar. 27, 2009, IPCOM000181285D, pp. 1-3.

Notice of Allowance for U.S. Appl. No. 12/816,117, U.S. Patent and Trademark Office, mailed Sep. 6, 2012, 12 pages.

* cited by examiner

PORTING VIRTUAL IMAGES BETWEEN PLATFORMS

RELATED APPLICATION

This application is a continuation of U.S. application Ser. No. 12/651,277, filed Dec. 31, 2009, titled "Porting Virtual Images Between Platforms," and having the same inventors as the above-referenced application.

BACKGROUND

Cloud computing is a term which describes internet based services. Internet based services are hosted by a service provider. Service providers may provide hardware infrastructure or software applications to requesting clients over a computer network. Requesting clients may access the software applications using traditional client-based "browser" software applications, while the software (instructions) and data are stored on servers maintained by the cloud computing providers.

SUMMARY

In an embodiment, an approach is provided that differences a source topology model associated with a source platform and a target topology model associated with a target platform. This differencing is performed by a processor and results in a topology difference. An operation in a workflow model is obtained from an asset library, the operation being associated with the topology difference. At least a portion of the asset library is stored in a persistent storage medium. The operation to deploy a portion of a solution is transmitted for deployment. The deployed portion of the solution includes a target image compatible with the target platform.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages, as defined solely by the claims, will become apparent in the non-limiting detailed description set forth below.

BRIEF DESCRIPTION OF THE DRAWINGS

An embodiment of the invention may be better understood, and its numerous objects, features, and advantages made apparent to those skilled in the art by referencing the accompanying drawings, wherein.

DETAILED DESCRIPTION

Figure 1:
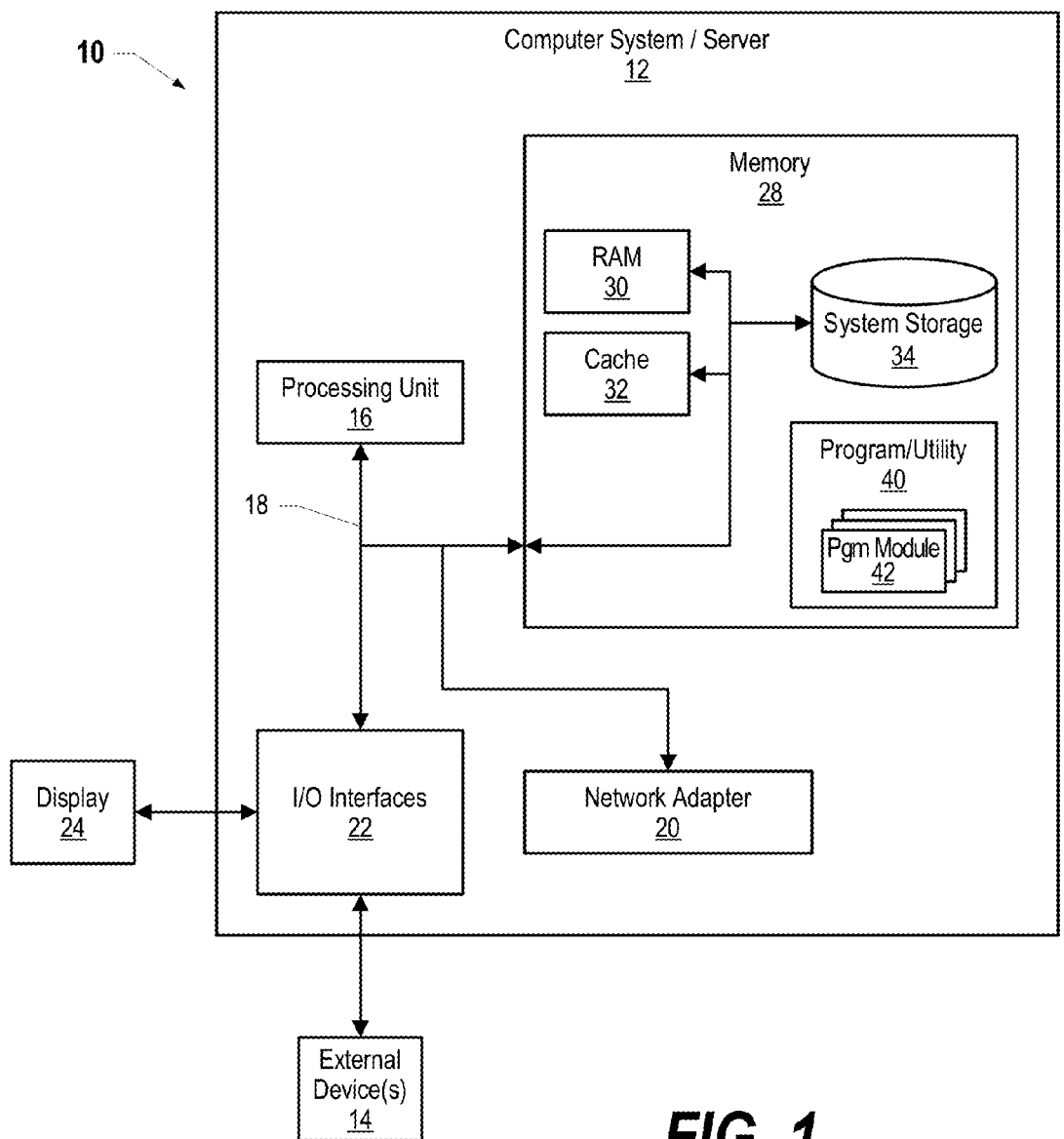
FIG. 1 is a block diagram of an embodiment of an information handling system which serves as a node in a cloud computing environment and in which the methods described herein can also be implemented.

For convenience, the Detailed Description has the following sections: Section 1: Cloud Computing Definitions and Section 2: Detailed Implementation.

Section 1: Cloud Computing Definitions

Many of the following definitions have been derived from the "Draft NIST Working Definition of Cloud Computing" by Peter Mell and Tim Grance, dated Oct. 7, 2009.

Cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises. It has security mechanisms in place. An example, of a security mechanism that may be in place is a firewall. Another example of a security mechanism that may be in place is a virtual private network (VPN).

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability.

A virtual image represents a virtual machine in a file system and may include configuration parameters as necessary to run it as a virtual machine. A virtual image may be executed by a software component called a hypervisor that may be located in a physical machine and may supplement an operating system of the physical machine. A virtual image may also be called a machine image or a virtual machine image.

A virtual machine is a software implementation of a machine that executes programs like a physical machine.

An "image" is the state of a computer system and the software running on the computer system. In a hypervisor system, the image may be a "virtual image" because the hypervisor controls access to the computer system hardware and, from the perspective of a guest operating system or partition, it appears as though the guest operating system/partition controls the entire computer system when, in fact, the hypervisor is actually controlling access to the computer hardware components and managing the sharing of the computer hardware resources amongst multiple partitions (e.g., guest operating systems, etc.).

Section 2: Detailed Implementation

As will be appreciated by one skilled in the art, the detailed implementation may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions (functional descriptive material) may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments. Certain well-known details often associated with computing and software technology are not set forth in the following disclosure, however, to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments, and the steps and sequences of steps should not be taken as required to practice the embodiments. Instead, the following is intended to provide a detailed description of one or more embodiments and should not be taken to be limiting, instead, any number of variations may fall within the scope which is defined by the claims that follow the detailed description.

The following detailed description will generally follow the summary, as set forth above, further explaining and expanding the definitions of the various aspects and embodiments as necessary. To this end, this detailed description first sets forth an example of a computing environment in FIG. 1 that is suitable to implement the software and/or hardware techniques associated with an embodiment. An embodiment of a networked environment is illustrated in FIG. 2 as an extension of the basic computing environment, to emphasize those modern computing techniques which can be performed across multiple discrete devices.

Figure 2:
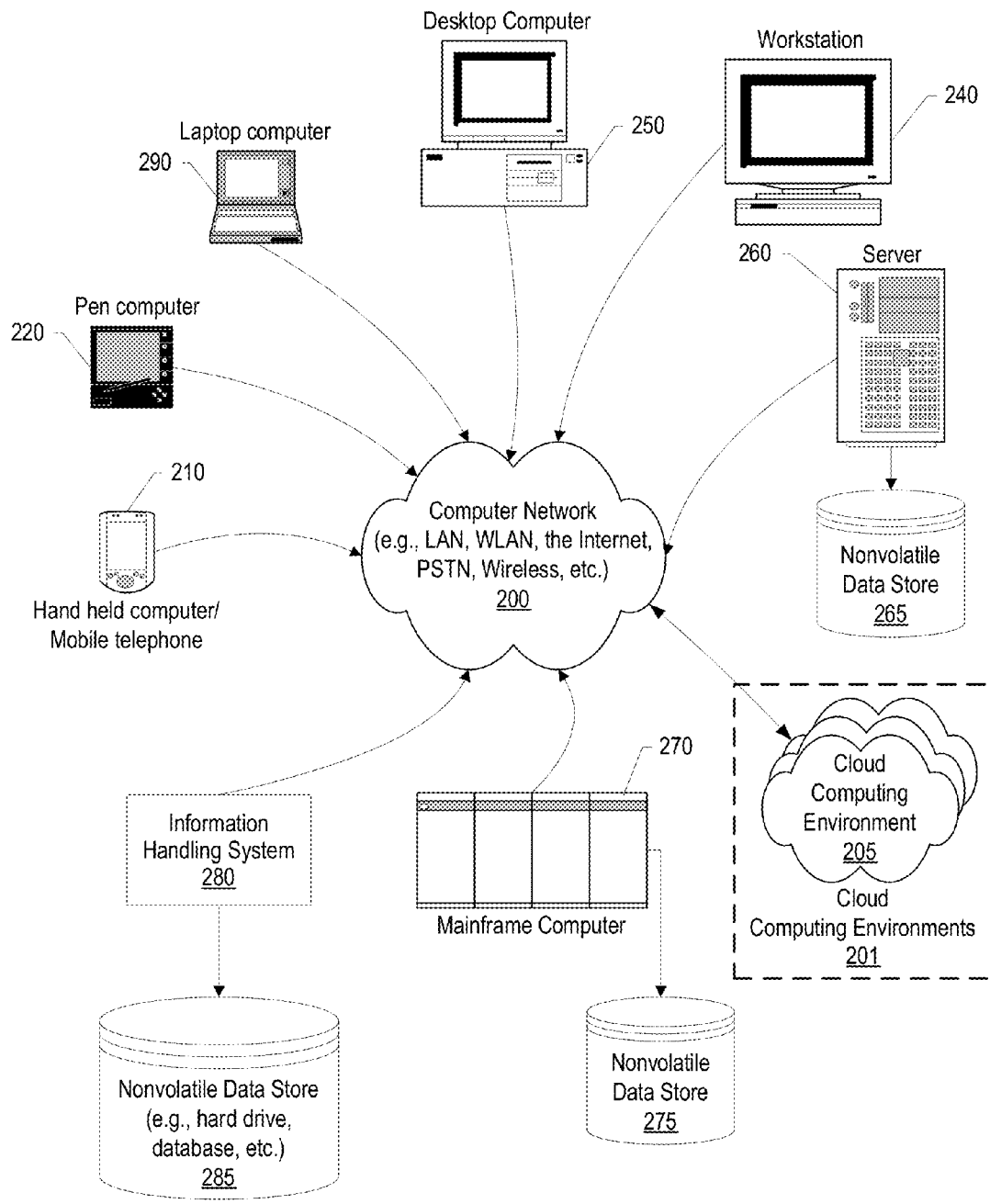
FIG. 2 is an embodiment of an extension of the information handling system environment shown in FIG. 1 to illustrate that the methods described herein can be performed on a wide variety of information handling systems which operate in a networked environment.

Referring now to FIG. 1, a schematic of an embodiment of an information handling system that can serve as a cloud computing node is shown. Cloud computing node 10 is only one example of a suitable cloud computing node and is not intended to suggest any limitation as to the scope of use or functionality described herein. Regardless, cloud computing node 10 is capable of being implemented and/or performing any of the functions set forth in section I above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a hard disk drive 34 can be provided for reading from and writing to a non-removable, non-volatile magnetic media (not shown and typically called a "hard drive"). Although not shown a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions described herein.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 2 provides an extension of the information handling system environment shown in FIG. 1 to illustrate that the methods described herein can be performed on a wide variety of information handling systems that operate in a networked environment according to an embodiment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems. In addition, computer network 200 can be used to connect various information handling systems to cloud computing environments 201 that includes cloud computing environment 205 and any number of other cloud computing environments. As described in FIGS. 3 and 4, a cloud computing environment 300 comprises a number of networked information handling systems (nodes) that work together to provide the cloud computing environment. Cloud computing environments 201 each provide abstraction layers shown in FIG. 4. An abstraction layer comprises a hardware and software layer 400, a virtualization layer 410, a management layer 420, and a workload layer 430. Components within the various layers 400-430 can vary from one cloud environment to another. An example of components found within the various layers is shown in FIG. 4.

Figure 3:
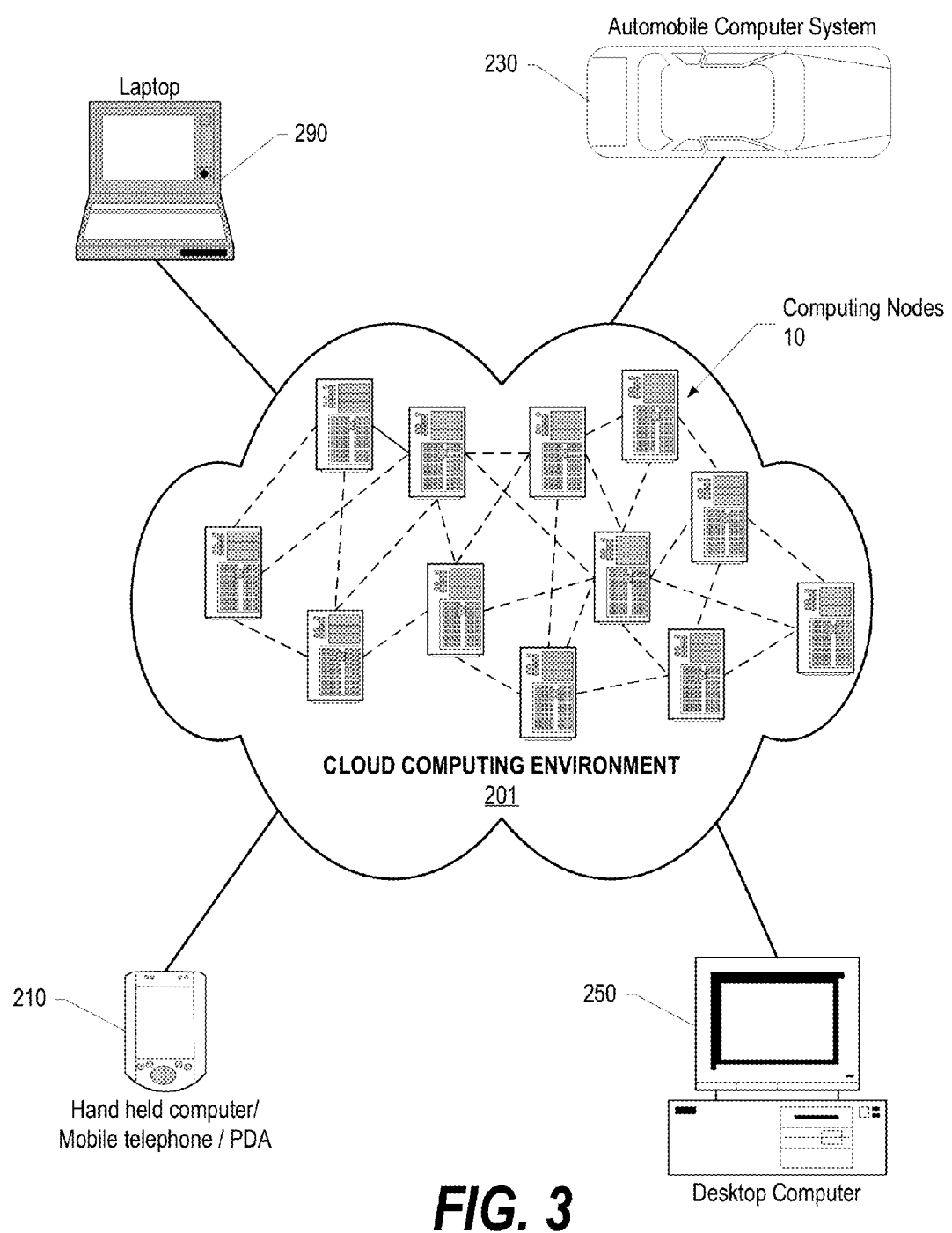
FIG. 3 is a diagram depicting an embodiment of a cloud computing environment.
Figure 4:
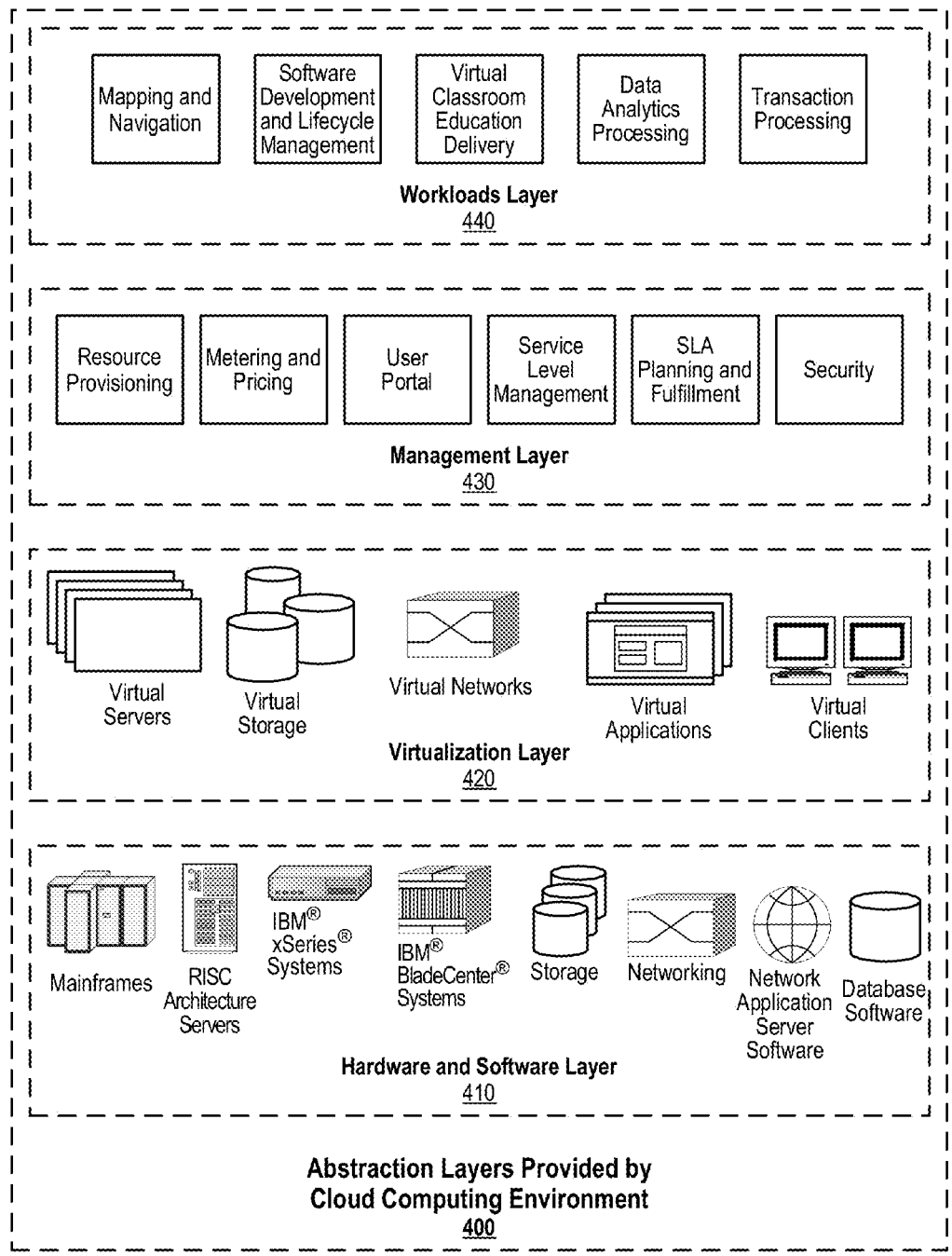
FIG. 4 is a diagram depicting an embodiment of a set of functional abstraction layers provided by the cloud computing environment.

Referring now to FIG. 3, an illustrative cloud computing environment 201 is depicted. As shown, cloud computing environment 201 comprises one or more cloud computing nodes 10 with which computing devices such as, for example, personal digital assistant (PDA) or cellular telephone 210, desktop computer 250, laptop computer 290, automobile computer system 230 communicate, and the other types of client devices shown in FIG. 2. This allows for infrastructure, platforms and/or software to be offered as services (as described above in Section 1) from cloud computing environment 201 so as to not require each client to separately maintain such resources. It is understood that the types of computing devices shown in FIGS. 2 and 3 are intended to be illustrative only and that cloud computing environment 201 can communicate with any type of computerized device over any type of network and/or network/addressable connection (e.g., using a web browser).

As the inventors herein have recognized, source and destination virtual images for different cloud (or hypervisor) providers may have incompatible hardware architectures, hypervisor technologies, types and/or versions of guest OS and/or middleware. Disk partitions in a virtual image may be specific to a cloud (or hypervisor) provider. Direct copying of contents with minor customizations may not work. For example, Amazon EC2 supports XEN virtual images for x86 hardware whereas an IBM cloud with p-series servers may only support System p images.

The inventors herein have also recognized that in some situations cloud (or hypervisor) specific configurations such as firewalls and block storage volumes, cannot be added to the ported solution due to API differences. For example, Amazon EC2 offers configuration options for attaching block storage volumes to running instances, but a VMware based private cloud may not provide that option.

The inventors herein have also recognized that solutions including multiple virtual images may need to be only partially ported to a different cloud (or hypervisor). For example, a solution with a business logic layer in a virtual image and a database layer in another virtual image may need only the business logic layer virtual image to be ported to a public cloud and database layer virtual image to remain in a private cloud due to data privacy issues. However, the inventors have also recognized that in some situations it may be desirable to port an entire solution to a different cloud (or hypervisor).

The inventors herein have also recognized that it may be desirable to identify and/or visualize changed, added, and/or deleted solution components/configurations and changed, added, and/or deleted corresponding deployment operations in a provisioning workflow when porting to a different cloud (or hypervisor). The inventors have also recognized that it may be desirable to store these changes, additions, and/or deletions in a patch for the source model. For example, porting a WebSphere application from a VMware based private cloud to Amazon EC2 requires changing from a base VMware image to a base Amazon Machine Image (AMI) with WebSphere and changed operations for deploying an AMI instead of a VMware image.

As the inventors herein have also recognized, it may be desirable to provision solutions to multiple clouds. For example, Amazon EC2 and IBM Development at Test Cloud both offer APIs to instantiate an image and remotely connect to the running virtual machine securely and execute solution provisioning tasks remotely.

Referring now to FIG. 4, an embodiment of a set of functional abstraction layers 400 provided by cloud computing environment 201 (FIG. 3) is shown. It should be understood in advance that the components, layers, and functions shown in FIG. 4 are intended to be illustrative only and the embodiments are not limited thereto. As depicted, the following layers and corresponding functions are provided:

Hardware and software layer 410 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 420 provides an abstraction layer from which the following virtual entities may be provided: virtual servers; virtual storage; virtual networks, including virtual private networks; virtual applications; and virtual clients.

Management layer 430 provides the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for both users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 440 provides functionality for which the cloud computing environment is utilized. Examples of workloads and functions which may be provided from this layer include: mapping and navigation; software development and lifecycle management; virtual classroom education delivery; data analytics processing; and transaction processing. As mentioned above, all of the foregoing examples described with respect to FIG. 4 are illustrative only and not limited to these examples.

Figure 5:
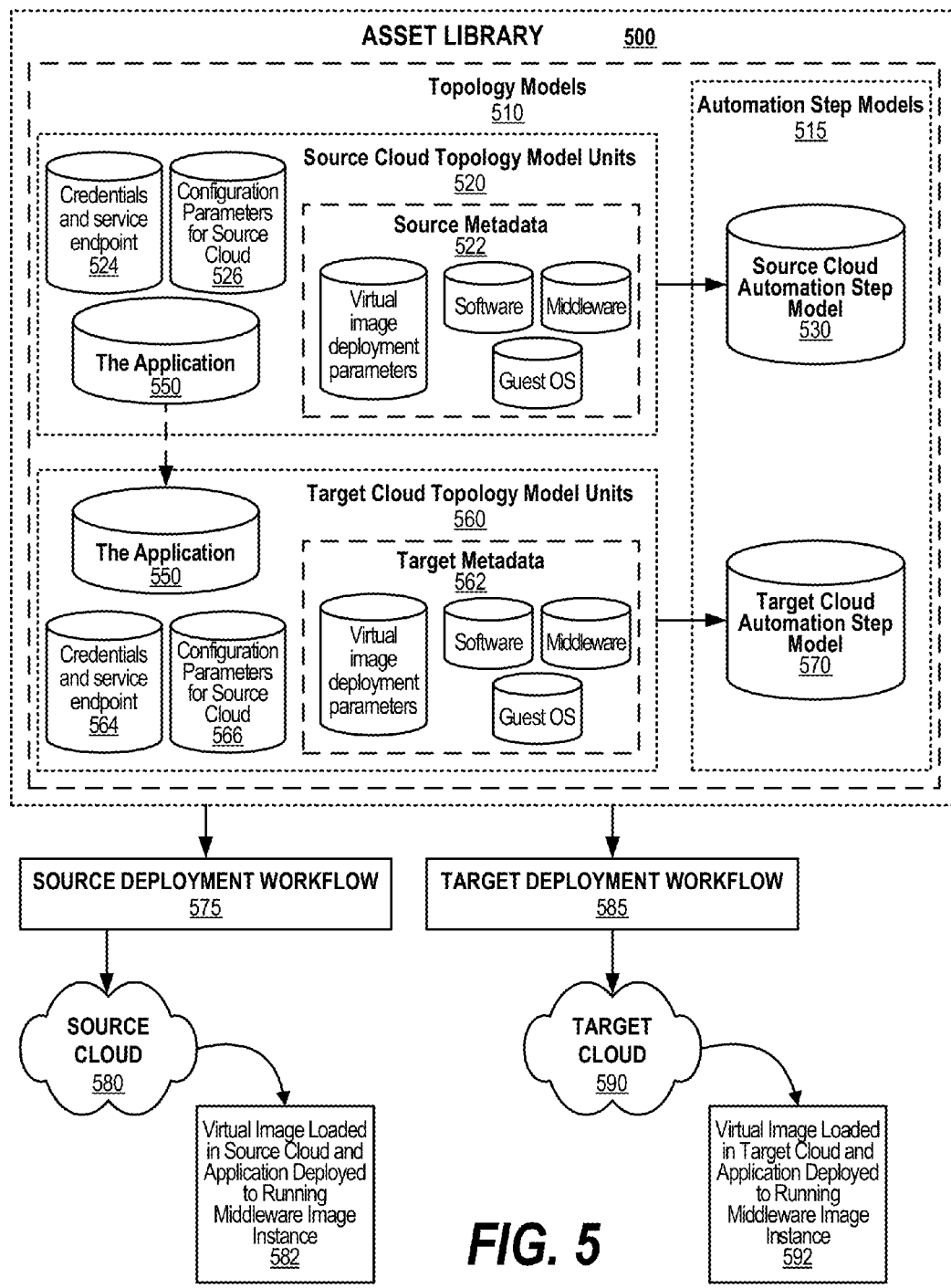
FIG. 5 is a diagram of an embodiment of source and target topology models and automation step models stored in an asset library being used to port a solution from a source to a target platform.

FIG. 5 is a diagram of an embodiment of source and target topology models and automation step models stored in an asset library being used to port a solution from a source to a target platform. In an embodiment, a "solution" is a software solution that includes one or more software applications that are executed by one or more hardware-based computer systems that is used to meet certain functional and non-functional requirements. A software solution includes one or more software applications as well as their related configuration parameters. In an embodiment, a solution is a turn-key solution and a one-stop approach. A solution may include multiple applications and may include configuration information affiliated with applications. A solution may be composite in nature in that it may include multiple virtual images. Part of a solution may be in one virtual image, and another part of the solution may be in another virtual image. Asset library 500 is used as a repository for topology and automation data. Topology data describes components of cloud-based solutions and their relationships. Asset library 500 is used to store data for any number of topology models 510. In an embodiment, asset library 500 is stored in a persistent storage media, such as a nonvolatile storage device, accessible from a computer system. Each of the topology models 510 describe the data used in a cloud-based solution. When first deploying a cloud-based solution (the "target cloud topology") to a particular cloud environment (the "target cloud"), the assets stored in asset library 500 can be searched in order to identify a topology already stored in the asset library (the "source cloud topology") that can be used to develop the target cloud topology by reusing various source cloud topology model units. In an embodiment, this occurs when porting a solution from the source cloud (e.g., a cloud provided by a first cloud provider) to the target cloud (e.g., a cloud provided by a second cloud provider).

An embodiment of a source platform would be a cloud (e.g., Amazon EC2™ cloud) where a solution has been deployed. An embodiment of a target platform could be another cloud (e.g., IBM Smart Business Development and Test Cloud) to which the solution is being ported. An embodiment of a source platform could be a hypervisor (e.g., VMWare hypervisor) and an embodiment of the corresponding target platform could be another hypervisor (e.g., KVM hypervisor). An embodiment of a source platform could be a physical computer system with disk partitions (e.g, IBM pSeries server) and an embodiment of the corresponding target platform could be another physical computer system (e.g., Sun Microsystems server). Additionally, platforms could be mixed and matched. For example, an embodiment of a source platform could be a hypervisor and an embodiment of the corresponding target platform could be a cloud.

While model units corresponding to numerous topology models may be stored in asset library 500, two are shown in FIG. 5—source cloud topology model units 520 and target cloud topology model units 560. Both the source and target cloud topology models include various model units such as metadata (522 and 562, respectively), credentials and service endpoints data (524 and 564, respectively), and configuration parameters (526 and 566, respectively). Model units may be used to represent applications, middleware, guest operating systems, virtual images, configuration parameters, and other solution components. Each model unit may include metadata such as virtual image type, id, configuration parameters, software versions, access credentials, firewall rules, etc. The metadata for the respective topology models includes a number of metadata items such as the virtual image deployment parameters, metadata concerning the software included in the topology, metadata concerning the middleware included in the topology, and metadata concerning the guest operating system included in the topology.

As shown, automation step models 515 are also stored in asset library 500 and are associated with topology model units. As the name implies, automation step models describe the automation steps used to deploy the various topology model units included in the topology. Source cloud automation step model 530 includes the automation steps used to deploy source cloud topology model units 520, while target cloud automation step model 570 includes the automation steps used to deploy target cloud topology model units 560. When developing target cloud topology model units 560 and target cloud automation step model 570, differences between the source cloud topology model units 520 and target cloud topology model units are identified along with new model units that exist in the target topology but not in the source topology. In addition, differences include removed model units that exist in the source topology but not in the target topology. Asset library 500 is searched in order to find automation step models for the different and new model units identified in the target topology model. The differences could be stored in asset library 500 as a patch and can be applied to a similar source topology model to create a target topology model. One or more processors may be used to perform a differencing between the source topology model that is associated with a source platform (e.g., source cloud, source hypervisor, etc.) and a target topology that is associated with a target platform (e.g., target cloud, target hypervisor, etc.). A topology model includes topology model units. The topology model units may include unit parameters or attributes and may also include a type. The type may be, for example, a virtual image, middleware, operating system, firewall, or any other type known in the art. A hypervisor is software that may run on top of an operating system. A hypervisor may run below an operating system. A hypervisor may allow different operating systems or different instances of a single operating system to run on a system at the same time. In other words, a hypervisor may allow a host system to host multiple guest machines. This differencing results in a topology difference that includes new, changed, and removed model units. The topology difference may be a set of topology model units corresponding to various components of the solution that are different in the target topology model with respect to the source topology model. The set of topology model units may need to be changed when porting the solution from a source platform to a target platform. A set that includes at least one operation in a workflow model (e.g., an automation step model stored in automation step models 515) is obtained from asset library 500. The operation in a workflow model is an action that may be performed. For example, an operation in a workflow model may be used to install a sMash application on top of a sMash application server. By way of another example, an operation in a workflow model may be used to instantiate a virtual image. Each operation is associated with one of the model units in the topology difference between the source and target topology models. In an embodiment, a complete solution (e.g., the solution that is being ported from the source topology to the target topology) is deployed by executing one or more of the obtained operations using one or more processors. In an embodiment, a portion of a solution is ported from the source topology to the target topology by executing one or more of the obtained operations using one or more processors. The deployed portion of the solution includes a target image that is compatible with the target platform (e.g., target cloud 590, a target hypervisor, etc.). In an embodiment, compatibility results from a variety of reasons such as hypervisor technology, hardware architecture, operating system versions, middleware versions, API's available in different clouds (such as configuring firewalls and VPNs) and the like. In an embodiment, incompatibility results from a variety of the same reasons where one or more components, discussed above, are incompatible from a source platform to a target platform.

As shown, source deployment workflow 575 operates to deploy the solution to source cloud 580. The deployment results in virtual image 582 being loaded in the source cloud and application 550 deployed to a running middleware image instance. Likewise, target deployment workflow 585 operates to deploy the solution to target cloud 590. The deployment results in virtual image 592 being loaded in the target cloud and application 550 deployed to a running middleware image instance.

Note that common application 550 is deployed to both source cloud 580 and target cloud 590. In an embodiment, application 550 is a platform-independent application, such as an application written in a platform-independent computer language, such as the Java programming language that runs on a "virtual machine" that is platform-dependent. The target image may be identified by using the metadata in the virtual image model unit and its contained units in the target topology model. This metadata may be used as input to search metadata for all known virtual images in the target cloud. All such metadata can be stored in the asset library. A target image may be identified and deployed to the target platform (cloud) so that the application can be deployed on the target platform running the target image. In an embodiment, the target image includes the operating system and the middleware (e.g., the virtual machine) that provides a target environment suitable for the application to operate. In this manner, a solution currently running in the source cloud and described in the source topology model can be ported and deployed to the target cloud with similar model units described in the target topology model.

Figure 6:
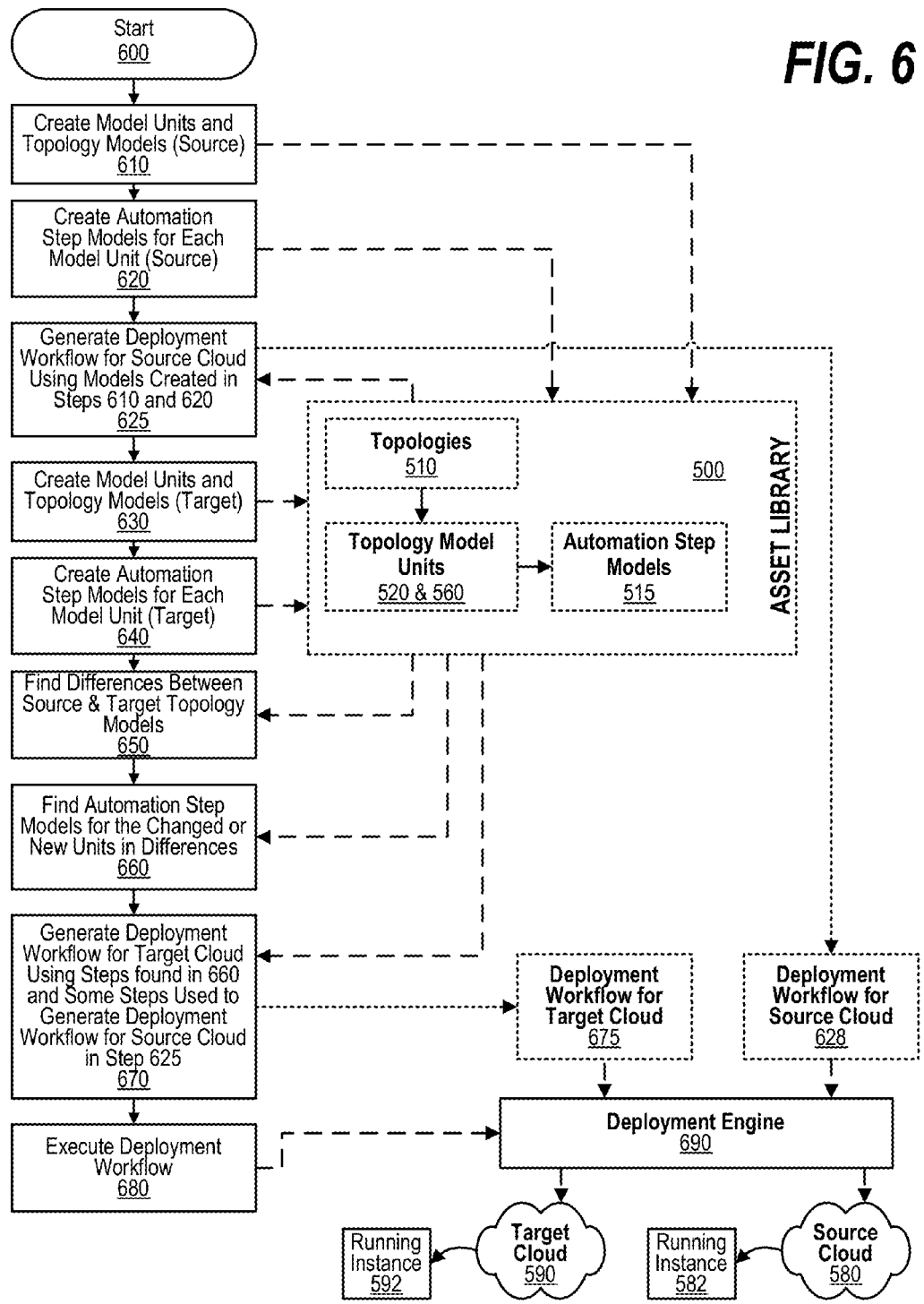
FIG. 6 is a flowchart showing steps taken to utilize topology model units to find commonalities and differences between the source and target topology models in order to generate deployment workflows according to an embodiment.

FIG. 6 is a flowchart showing steps taken to utilize topology model units to find commonalities and differences between the source and target topology models in order to generate deployment workflows according to an embodiment.

The commonalities may be a set of topology model units corresponding to various components of the solution that are the same in the target topology model with respect to the source topology model. An example of a commonality may be that the type of virtual image represented in a model unit associated with the target platform may be the same as the type of virtual image represented in a model unit associated with the source platform. The commonalities may be partial in nature, such as when the type is the same for both model units but some other parameter such as for example, an image identifier, is different in the model unit associated with the target topology model as compared to the model unit associated with the source topology model. The commonalities may be entire in nature, such as when all of the parameters of the two topology model units are the same, and there are not any parameters that are different. If the commonalities are entire in nature, the associated deployment operations and solution components may not need to be changed when porting the solution from the source platform to the target platform. If the commonalities are partial in nature, these may be treated as a difference or they may be treated as entirely common.

The differences may be a set of topology model units corresponding to various components of the solution that are different in the target topology model with respect to the source topology model. An example of a difference may be that the type of virtual image represented in a model unit associated with the target platform may be different than the type of virtual image represented in a model unit associated with the source platform. If there is a difference, the associated deployment operations and solution components may need to be changed when porting the solution from a source platform to a target platform.

Processing commences at 600 whereupon, at step 610, source topology model units and topology models are created and stored in asset library 500. At step 620, an automation step model is created for some topology model units that were created for the source topology models in step 610 and these automation models are also stored in asset library 500. At step 625, the models (topology and automation) that were created in step 610 and 620 are used to generate deployment workflow 628 for source cloud 580.

Steps 630 and 640 are similar to steps 610 and 620, however steps 630 and 640 are directed towards a different (target) cloud. At step 630, target topology model units and topology models are created and stored in asset library 500. These target topology model units and topology models are designed to deploy the same solution deployed on the source cloud, however the target topology model units and topology models are designed to run the solution on a different "target" cloud. At step 640, an automation step model is created for some of the topology model units that were created for the target topology models in step 630 and these automation models are also stored in asset library 500.

At step 650, the source and target topology models are read from asset library 500 and compared in order to identify differences between the models. These differences can include changed, new, or removed units. Changed model units are those units that exist in both the source and target models but are have different parameters or sub-types, e.g. a virtual image of a source topology sub-type is different from a virtual image of a target topology sub-type. Difference in parameters can include middleware versions. New model units are those units that did not exist in the source topology but were added to the target topology (e.g., a topology model unit that was not needed to deploy the solution to the source cloud but is needed in order to deploy the solution to the target cloud, etc.). Removed model units are ones which were in the source topology but were not present in the target topology. At step 660, asset library 500 is searched for automation step models corresponding to the identified changed and new units. The automation step models found in step 660 are automation step models stored in asset library 500. For example, if a new or changed model unit was identified, a different topology stored in the asset library may already exist that corresponds to the identified new or changed model unit. In addition, when a model unit is first encountered, an automation step model can be developed for the encountered model unit and stored in asset library 500 so that it will be found when step 660 operates.

At step 670, deployment workflow 675 for target cloud 590 is generated using automation step models identified in step 660 (for new/changed model units) and some of the steps used to generate the deployment workflow for the source cloud in step 625 (for unchanged model units). Note that deployment operations for the removed units are dropped from the source workflow model. At step 680, deployment workflows 675 and 628 are executed by deployment engine 690 resulting in running instance 582 of the solution in source cloud 580 and running instance 592 of the solution in target cloud 590. In one embodiment, execution of the deployment workflow is performed by transmitting the operations included in the workflow model to deployment engine 690. Deployment engine 690 may be a software process on the same computer system that performs the generate step at 670 or may be on a different computer system connected via a computer network. If the same computer system is used, then the operation may be transmitted using an internal operation (e.g., via a subroutine call, via execution of in-line code that handles the deployment operations, via an external program call, etc.). If a different computer system is used, then the operation may be transmitted to the other computer system via a transmission through a network such as a private computer network (e.g., LAN), and/or a public network (e.g., the Internet, the public switched telephone network (PSTN), etc.). While one deployment engine is shown, different deployment engines can be used. In an embodiment, the automation step models provide a generic representation for steps used to automate deployment of the various model units while the generated deployment workflows (628 and 675) include functional descriptive material (e.g., scripts, etc.) designed to be read and processed by deployment engine 690.

Figure 7:
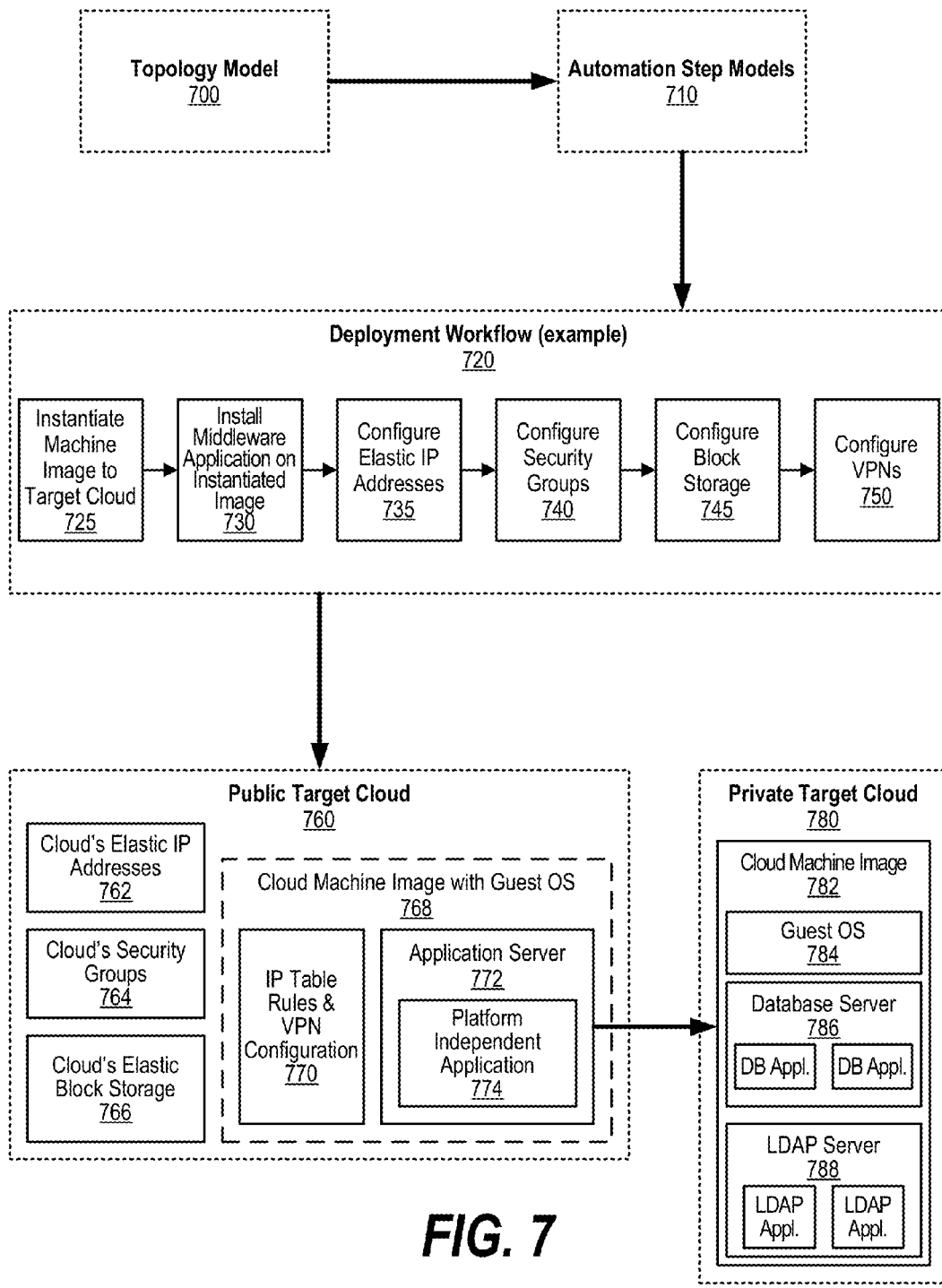
FIG. 7 is a diagram showing an embodiment of automation step models used to create an example deployment workflow that is deployed to a cloud environment.

FIG. 7 is a diagram showing an embodiment of automation step models used to create an example deployment workflow that is deployed to a cloud environment. Topology model 700 includes topology model units. Automation step models 710 correspond to some of the topology model units. Deployment workflow 720 is generated from automation step models 710 and provides a number of operations to deploy the solution. FIG. 7 shows an example of a hybrid solution that includes public target cloud 760 and private target cloud 780. An example of the public target cloud function would be the customer front-end operation publicly accessible from a network, such as the Internet. An example of the private target cloud function would be the backend server operation that handles database and LDAP operations.

In the example shown, the deployment workflow includes operations 725 to 750. Operation 725 instantiates a particular machine image to public target cloud 760 and private target cloud 780. This results in cloud machine image with guest OS 768 being instantiated on public target cloud 760. In an embodiment, operation 725 also instantiates cloud machine image 782 on private target cloud 780, while in an embodiment cloud machine image 782 is a common backend server utilized by multiple public target clouds. Cloud machine image 782 instantiated and running on private target cloud 780 includes guest operating system 784 which may be a different operating system than the operating system running on the public target cloud. Cloud machine image 782 may also include database server 786 (e.g, IBM DB2™ database server, etc.) under which database applications operate. Cloud machine image 782 may also include LDAP (Lightweight Directory Access Protocol) server 788 under which LDAP applications operate.

Operation 730 installs a middleware application, such as the IBM Websphere® sMash™ middleware application on the image instantiated on the public target cloud. This results in application server 772 running on cloud machine image with guest OS 768. In addition, operation 730 can install platform-independent application 774 that runs on the application server. As shown, cloud machine image with guest OS 768 includes IP table rules and VPN configuration 770 and public target cloud includes cloud's elastic IP addresses 762, cloud's security groups 764, and cloud's elastic block storage 766. In one cloud environment, operation 735 runs to configure elastic IP addresses, resulting in a configuration of the cloud's elastic IP addresses 762. In this cloud environment, operation 740 runs to configure cloud's security groups 764, and operation 745 runs to configure cloud's elastic block storage 766. Operation 750 runs to configure VPNs (virtual private networks). The result of operation 750 is an update to IP Table Rules and VPN Configuration 770 running in instantiated image 768 which sets up a virtual private network between public target cloud 760 and private target cloud 780.

Figure 8:
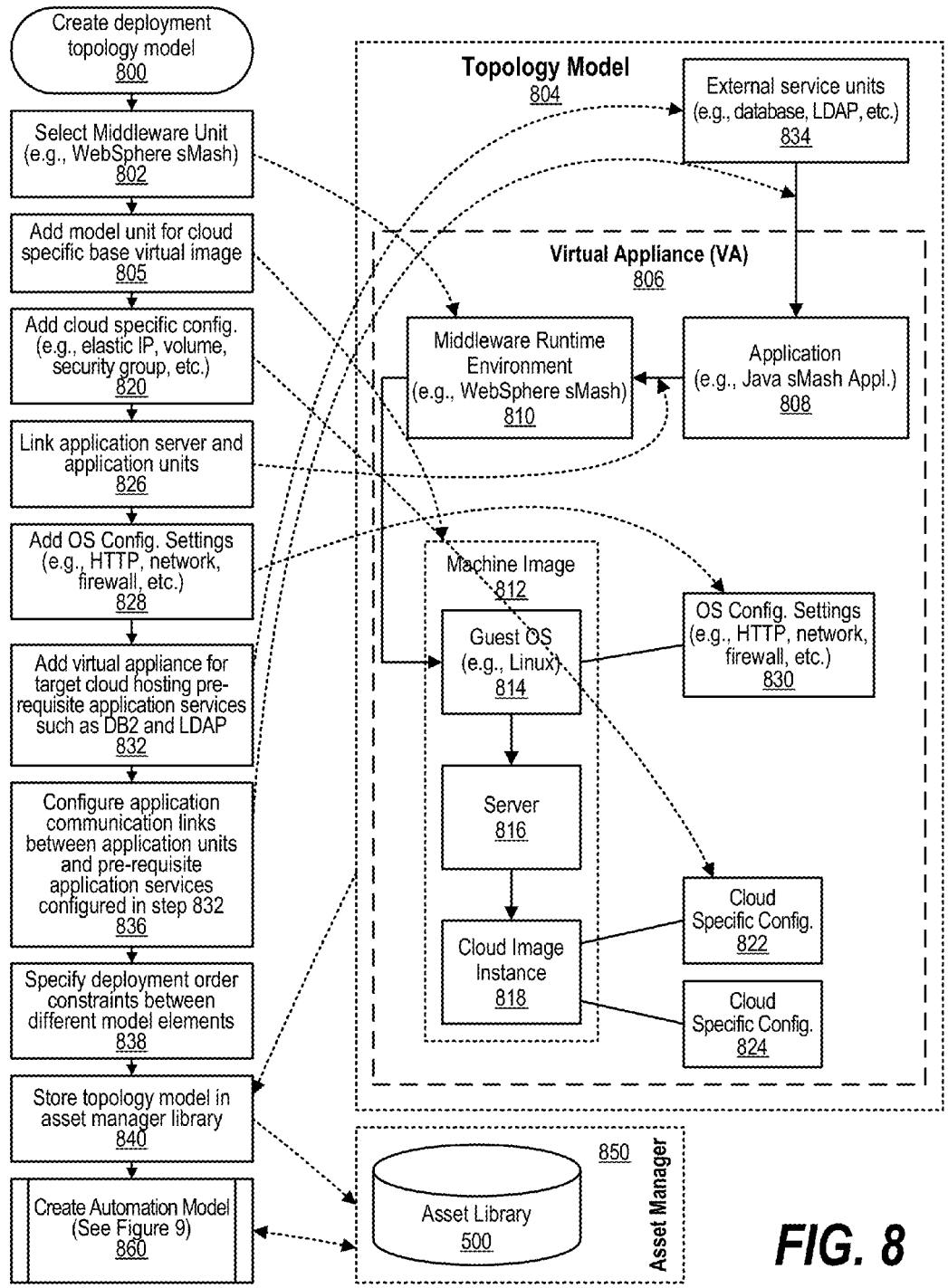
FIG. 8 is a flowchart showing steps taken to create a topology model according to an embodiment.

FIG. 8 is a flowchart showing steps taken to create a topology model according to an embodiment. Processing commences at 800 whereupon, at step 802, a middleware unit is selected, such as a Java virtual machine (e.g., IBM WebSphere® sMash application, etc.). The middleware unit is generally platform dependent. Topology model 804 includes virtual appliance 806 into which the selected middleware runtime environment 810 is placed. Platform independent application 808, such as a Java application, is also selected and associated with middleware runtime environment 810. At step 805, a topology model unit is added for a cloud-specific base virtual image. Machine image 812 is then included in virtual appliance 806. In this example, machine image 812 includes guest operating system 814 (e.g., Linux operating system, etc.), server software 816, and cloud image instance 818.

Metadata for existing virtual images compatible with a cloud may be found in one or more cloud-specific image libraries for that cloud. Such metadata may include description of software components preinstalled in the existing virtual images. The metadata in the virtual appliance unit and its included units in the target topology model may describe the prerequisite software components for the solution which may be found preinstalled in the cloud specific base virtual image. The metadata in the virtual appliance unit may be used to search the metadata in the image libraries to find a suitable base virtual image for deploying the solution to the target cloud. If the virtual images identified as a result of the search do not include all the prerequisite software components or the right versions of the prerequisite software components then a closest match base virtual image may be determined. Such a closest match base virtual image may then be enhanced as part of a deployment workflow by adding, updating, or removing software components in the virtual image.

At step 820, in an embodiment, cloud specific configuration settings 822 and 824 are added, such as elastic IP addresses, volume information, security group settings, and the like. At step 826, the application server (middleware runtime environment 810) is linked to application units (platform independent application 808). At step 828, operating system specific configuration settings are added and associated with guest operating system 814. These operating system specific configuration settings can include HTTP settings, network settings, firewall settings, etc. At step 832, one or more virtual appliances (external service units 834) are added for the target cloud hosting prerequisite application services, such as database services and LDAP services, which are provided externally from the cloud-based virtual appliance. At step 836, application communication links are configured between the application units (application 808) and the pre-requisite external services that were added in step 832. At step 838, deployment order constraints are specified between different model units. Step 838 allows a sequencing of the automation steps used to deploy the solution. At step 840, the topology model 804, including all of the topology model units and the specified deployment order, are stored in asset library 500. In an embodiment, asset library 500 is managed by asset manager software application 850. At predefined process 860, the stored topology model and specified deployment steps are used to create an automation model that is also stored in asset library 850 (see FIG. 9 and corresponding text for processing details regarding the creation of the automation model).

Figure 9:
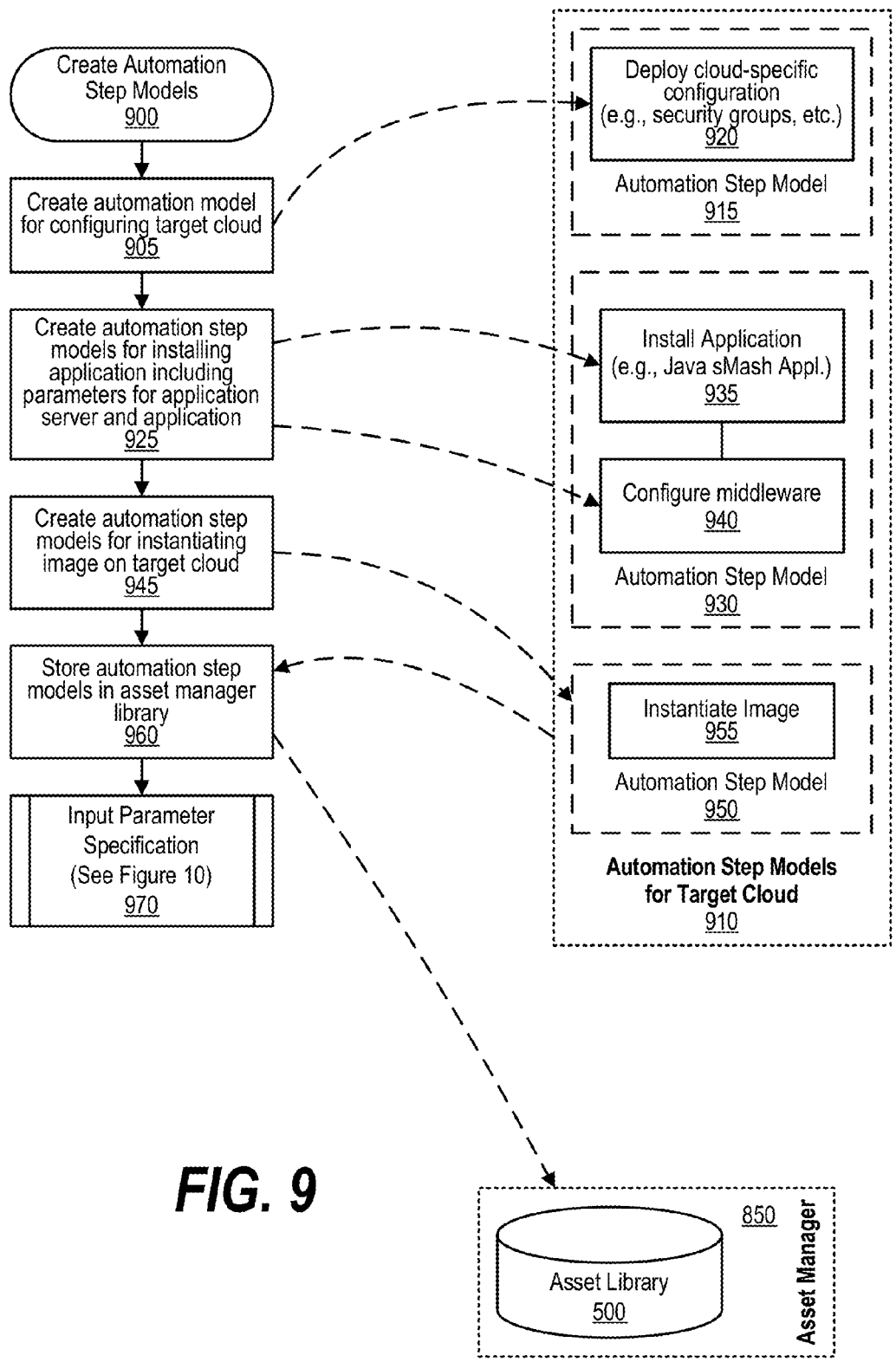
FIG. 9 is a flowchart showing steps taken to create automation step models according to an embodiment.

FIG. 9 is a flowchart showing steps taken to create automation step models according to an embodiment. Processing creates various automation step models 910 used for deploying the solution to the target cloud. Processing commences at 900 whereupon, at step 905, automation step model 915 is created. Automation step model 915 includes operation 920 to deploy a cloud-specific configuration establishing security groups, etc. in the target cloud. At step 925, automation step model 930 is created for installing the application including parameters for the application server (middleware runtime environment) and the platform-independent software application. Automation step model 930 includes operation 935 used to install the platform-independent (e.g., Java sMash application, etc.) and operation 940 used to configure the middleware runtime environment. At step 945, automation step model 950 is created for instantiating an image on the target cloud. Automation step model 950 includes operation 955 used to instantiate a particular image on the target cloud. At step 960, automation step models 910 are stored in asset library 500 shown being managed by asset manager application software 850. At predefined process 970, input parameter specifications are provided and stored with the target topology in the asset library (see FIG. 10 and corresponding text for processing details).

Figure 10:
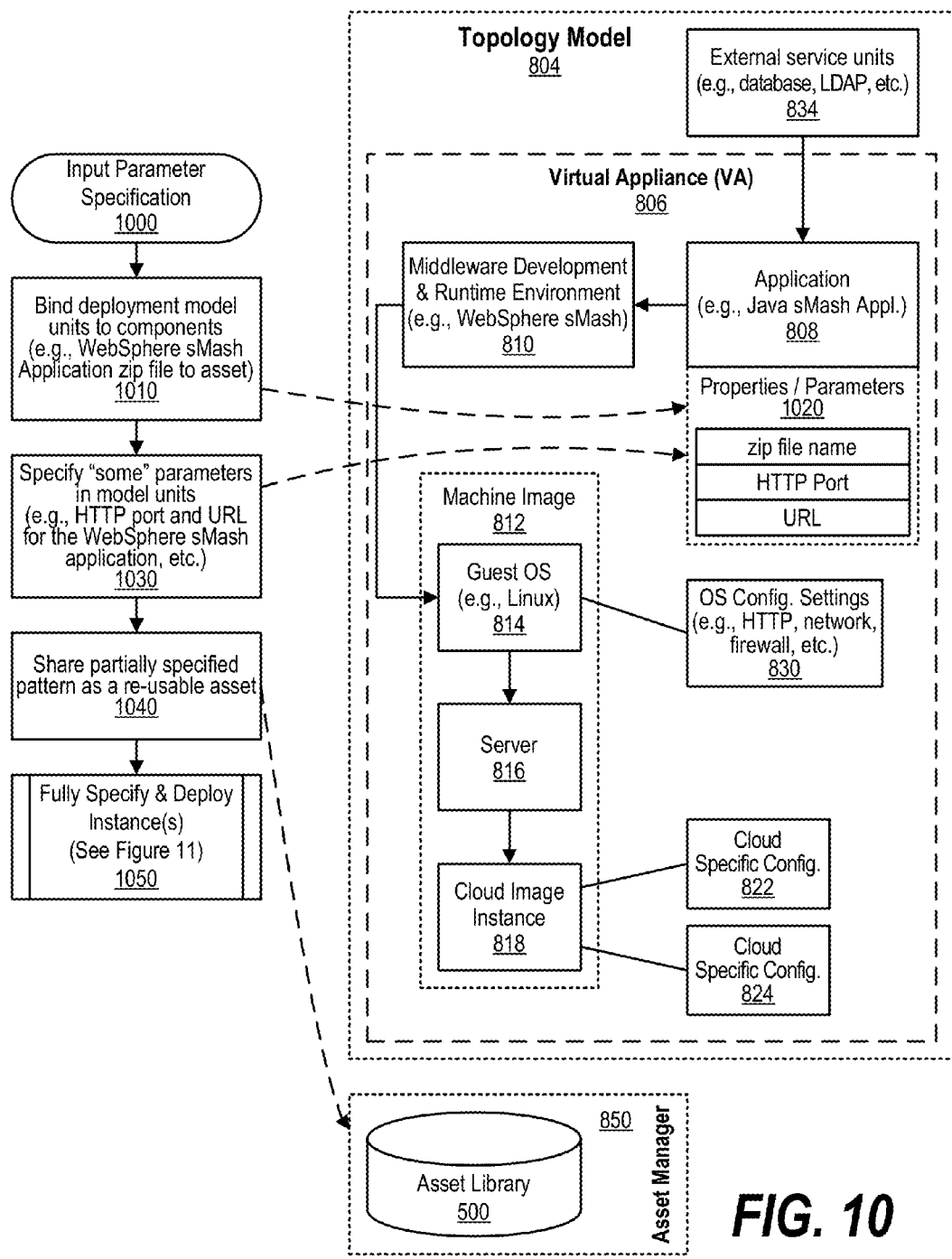
FIG. 10 is a flowchart showing steps taken to specify input parameters and store in the topology model according to an embodiment.

FIG. 10 is a flowchart showing steps taken to specify input parameters and store in the topology model according to an embodiment. In FIG. 10 topology model 804 introduced in FIG. 8 is shown. In FIG. 10, processing commences at 1000 whereupon, at step 1010, deployment model units are bound to components. For example, a particular compressed file asset in the asset library containing the deployable platform independent binaries is bound to the application unit in the topology model. Application 808 includes properties and parameters 1020 that would, for example, have a specified compressed file ("zip" file) configured therein. At step 1030, some, but perhaps not all, of the configuration parameters are specified for topology model units. For example, an HTTP port, a zip file name, and a URL for the application could be specified. At step 1040, the partially specified pattern is shared in asset library 500 as a reusable asset. At predefined process 1050, the instance(s) are fully specified and deployed to the target platform (see FIG. 11 and corresponding text for processing details).

Figure 11:
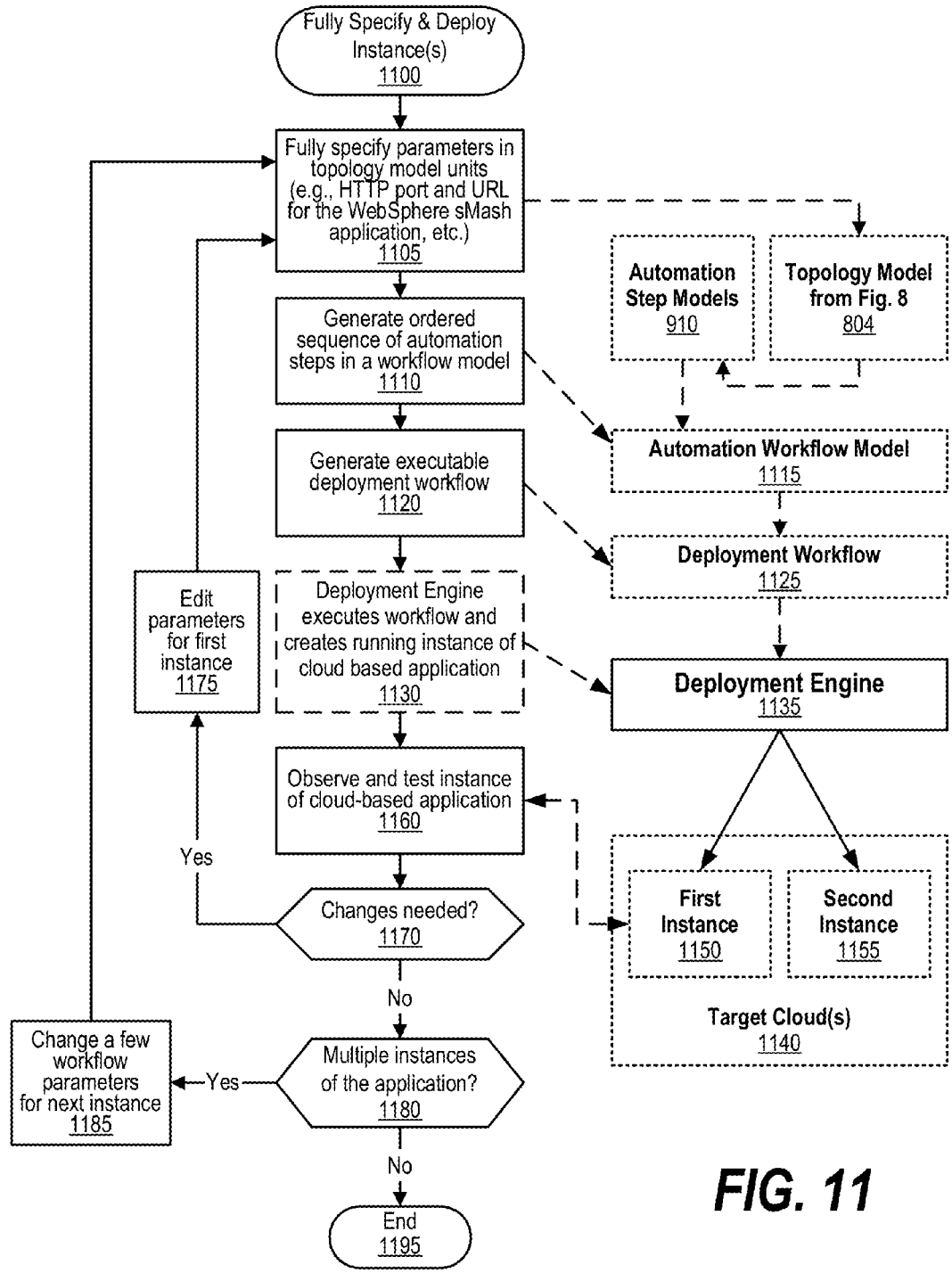
FIG. 11 is a flowchart showing steps taken to fully specify and deploy a running instance of the cloud based application according to an embodiment.

FIG. 11 is a flowchart showing steps taken to fully specify and deploy a running instance of the cloud based application according to an embodiment. The flowchart shown in FIG. 11 also shows deploying multiple instances for multi-tenancy with minor configuration changes during specification. Processing commences at 1100 whereupon, at step 1105, parameters in the topology model units are fully specified and stored in topology model 804. Some topology model units are associated with automation step models 910 that describe the operation used to deploy the topology model units. At step 1110, an ordered sequence of deployment operations is generated and stored in automation workflow model 1115. In an embodiment, automation workflow model is a generic depiction of the operations used to deploy the topology model units. Deployment workflow 1125 is generated from automation workflow model 1115 at step 1120. In an embodiment, deployment workflow 1125 is a non-generic depiction of the operations that is in a format that can be run by a particular deployment engine 1135. In this manner, step 1120 can be executed to provide different deployment workflows that operate with different deployment engines.

At step 1130, deployment engine 1135 executes deployment workflow 1125 and creates one or more running instances (instances 1150 and 1155) of the cloud based application running on one or more target clouds 1140. At step 1160, the running instance is observed and tested to ensure that the cloud based solution is running properly. A determination is made as to whether changes are needed to the parameters specified in the model units (decision 1170). If changes are needed, then decision 1170 branches to the "yes" branch whereupon, at step 1175, the parameters of the instance are edited and processing loops back to re-generate the workflow model, deployment workflow, and re-execute the deployment workflow by the deployment engine. This looping continues until no further changes are needed, whereupon decision 1170 branches to the "no" branch. Note that it may not be necessary to regenerate the workflow model, if such parameters are specified as input parameters that can be changed prior to re-deployment through user input. A determination is made as to whether multiple instances of the application (cloud based solution) are being created in the target cloud (or target clouds). If multiple instances of the application are being created, then decision 1180 branches to the "yes" branch whereupon, at step 1185, a few workflow parameters are changed in order to create the next instance, and processing loops back to generate another workflow model and another deployment workflow, and processing executes the new deployment workflow using the deployment engine. For example, a new instance may need to be deployed for a new tenant in a multi-tenant solution. In an embodiment, multi-tenancy is the ability to share platforms (e.g., clouds, hypervisors) between multiple clients. In another example, new instance(s) of the solution may be needed in order to satisfy different performance or security requirements in varying workloads. This looping continues until no more instances of the application are desired, at which point decision 1180 branches to the "no" branch and processing ends at 1195.

Figure 12:
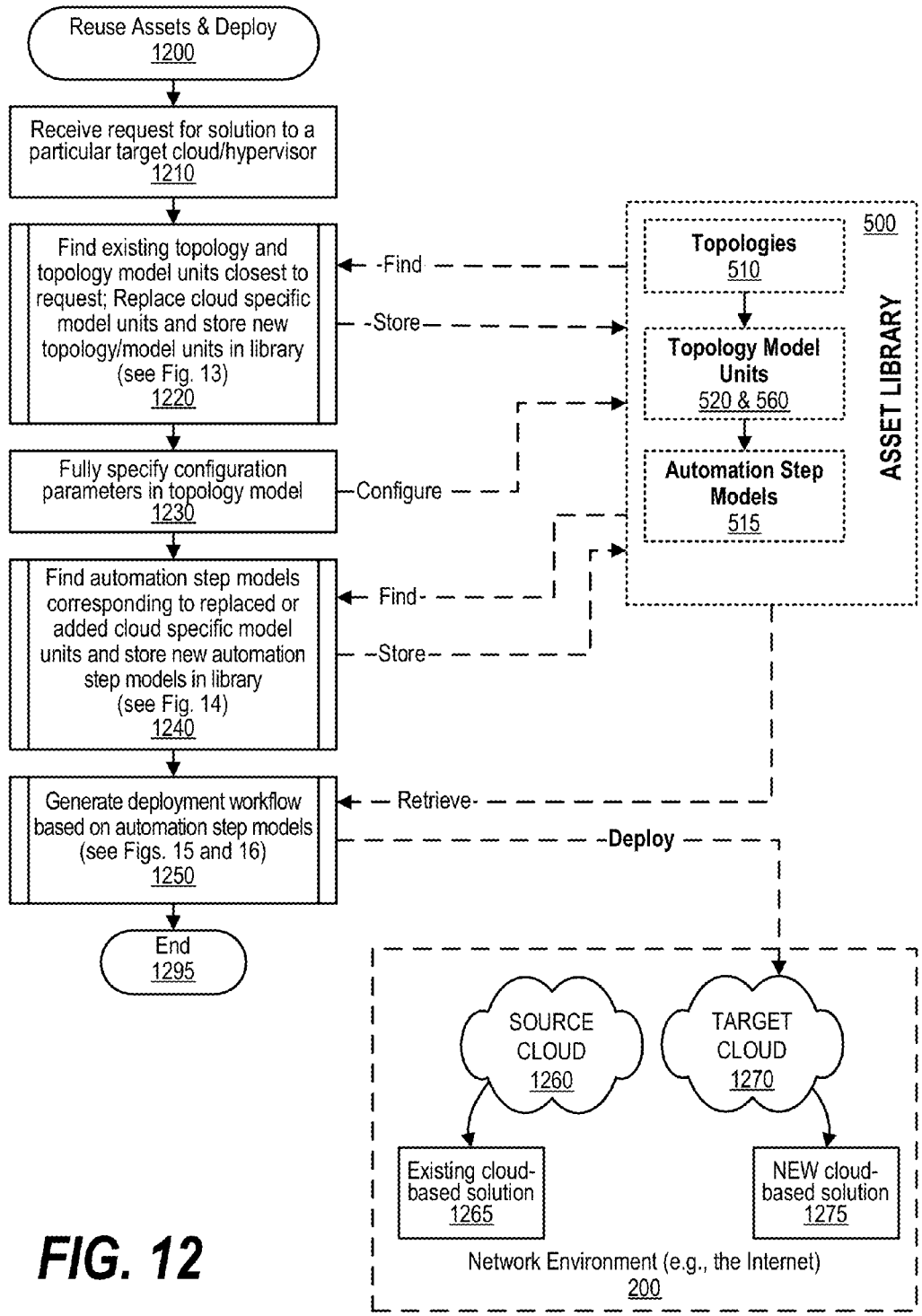
FIG. 12 is a flowchart showing steps taken to reuse assets stored in the asset library and deploy the solution to a target cloud environment using the reused assets according to an embodiment.

FIG. 12 is a flowchart showing steps taken to reuse assets stored in the asset library and deploy the solution to a target cloud environment using the reused assets according to an embodiment. Processing commences at 1200 whereupon, at step 1210, processing receives a request to port a solution to a particular target cloud or hypervisor. At predefined process 1220, an existing topology and topology model units closest to the request are found in asset library 500. Predefined process 1220 includes replacing cloud specific model units and storing the new topology and new model units in asset library 500. See FIG. 13 and corresponding text for processing details regarding predefined process 1220. At step 1230, configuration parameters in the target topology model are fully specified and stored in asset library 500. At predefined process 1240, automation step models corresponding to replaced or added cloud-specific model units are found in asset library 500. Also in predefined process 1240, automation step models corresponding to target cloud specific topology model units are found within asset library 500 and the automation step models are stored in asset library 500. The asset step models are used to deploy the topology model units to the target cloud. See FIG. 14 and corresponding text for processing details regarding predefined process 1240. At predefined process 1250, a deployment workflow is generated based upon the automation step models (see FIG. 15 and corresponding text for processing details, and see FIG. 16 and corresponding text for details regarding deployment of a composite solution). The result of deployment is source cloud 1260 with instance 1265 of an existing cloud based solution, and target cloud 1270 with new instance 1275 of the cloud based solution. In an embodiment, both the source and target clouds are accessible from computer network 200, such as the Internet. So, for example, each instance can provide an instance of a Web based application accessible by clients over the computer network, such as by using client-based Web browsing software.

Figure 13:
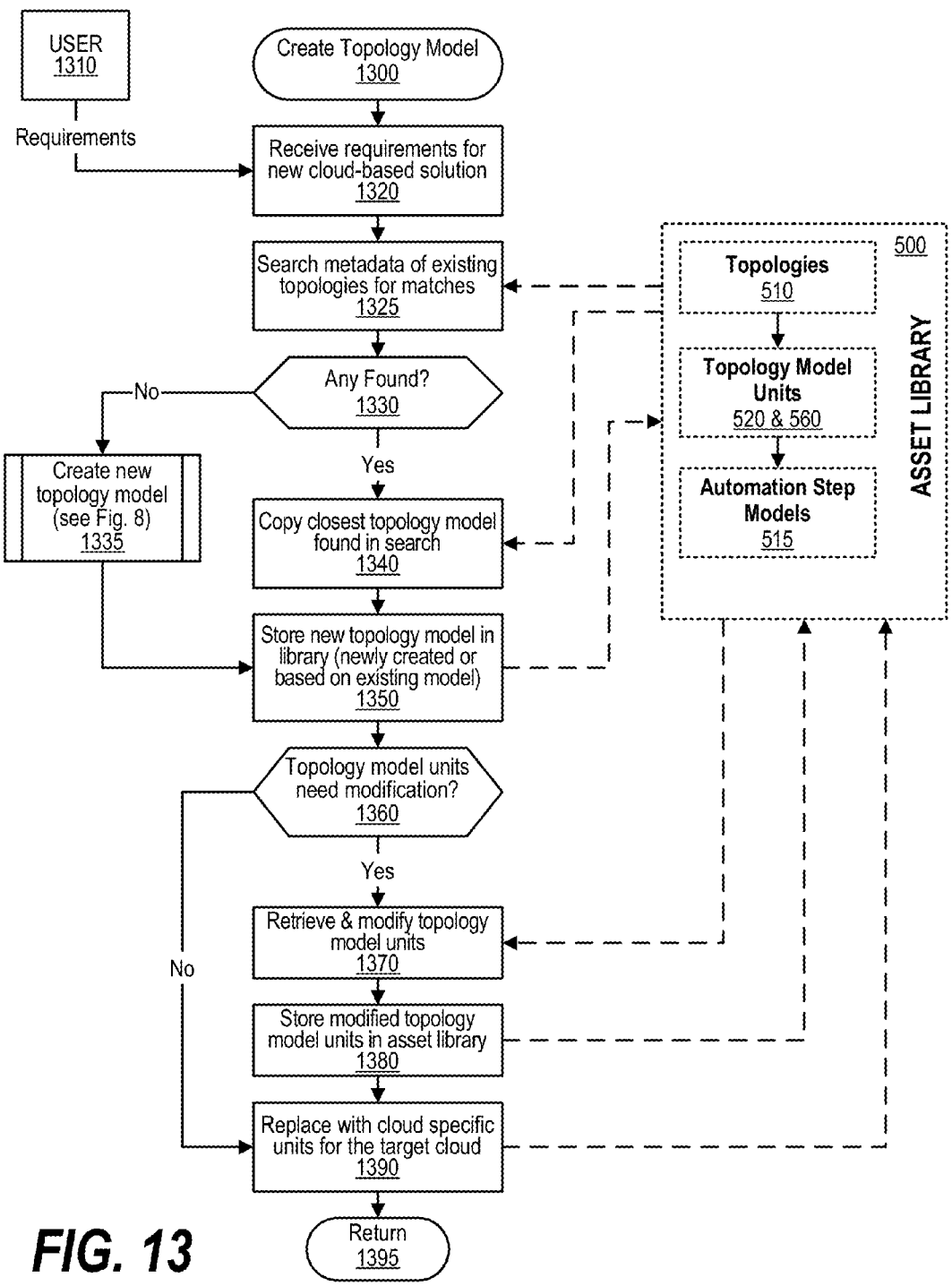
FIG. 13 is a flowchart showing steps taken to find existing topology units matching a request, replace cloud specific model units, and store new and changed model units in the asset library according to an embodiment.

FIG. 13 is a flowchart showing steps taken to find existing topology units matching a request, replace cloud specific model units, and store new and changed model units in the asset library according to an embodiment. FIG. 13 is called by predefined process 1220 shown in FIG. 12. Processing shown in FIG. 13 commences at 1300 whereupon, at step 1320, requirements for a new cloud based solution are received from user 1310. At step 1325, metadata of existing topology models stored in asset library 500 are searched in order to find existing topology models that match, to some extent, the requirements provided by the user. In an embodiment, differences computed earlier could be retrieved from asset library 500 as a patch and can be applied to an existing source topology model to create a target topology model. A determination is made as to whether any existing topology models that match the user's requirements were found in the asset library (decision 1330). If no topology models currently exist in the asset library matching the user's requirements, then decision 1330 branches to the "no" branch whereupon, at predefined process 1335, a new topology model is created (see, e.g., FIG. 8 and corresponding text for an example of creating a new topology model). On the other hand, if one or more topology models were found that match the user's requirements, then decision 1330 branches to the "yes" branch whereupon, at step 1340, the existing topology model found in asset library that most closely matches the user's requirements is copied. At step 1350, the new topology model is stored in the asset library (either a newly created topology model created in predefined process 1335 or an existing topology model copied in step 1340).

A determination is made as to whether topology model units need modification (decision 1360). For example, if a topology model was copied at step 1340, the new target topology model may need modification if the copied topology model does not exactly match the requirements specified by the user. If one or more topology model units need modification, then decision 1360 branches to the "yes" branch whereupon, at step 1370, the topology model units needing modification are retrieved from the target topology model and modified to meet the user's requirements. At step 1380, the modified topology model units are stored in the target topology model in asset library 500. Returning to decision 1360, if topology model units do not need modification, then decision 1360 branches to the "no" branch bypassing step 1370 and 1380. At step 1390, cloud specific model units for the target cloud are replaced. Processing then returns to the calling routine (see FIG. 12) at 1395.

Figure 14:
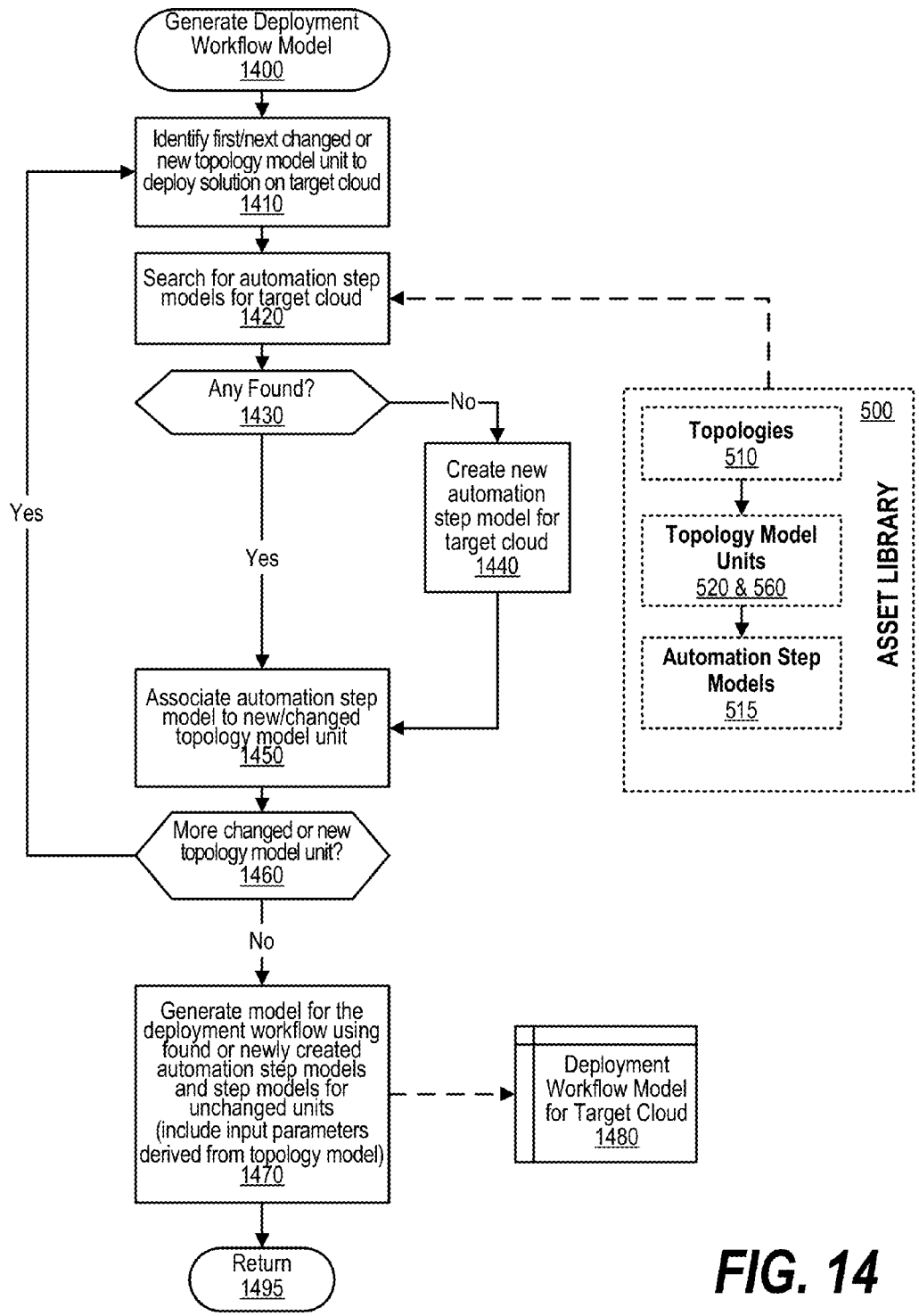
FIG. 14 is a flowchart showing steps taken to generate a deployment workflow model according to an embodiment.

FIG. 14 is a flowchart showing steps taken to generate a deployment workflow model according to an embodiment. FIG. 14 is called by predefined process 1240 shown in FIG. 12. Processing shown in FIG. 14 commences at 1400 whereupon, at step 1410, the first changed or new topology model unit used to deploy the solution on the target cloud is identified. Note that source topology model units that were not changed do not need to be identified because the automation step model already associated with the unchanged topology model unit may be used. Note that if any model unit is removed from the source topology model then the corresponding deployment operation may also be removed from the target workflow model. Note also that in an embodiment multiple topology model units can be associated with an automation step model (ASM). If multiple topology model units are associated with an automation step model, then a check can be made as to whether all the units are present in the target topology model. At step 1420, asset library 500 is searched for automation step models associated with the target cloud. A determination is made as to whether any matching automation step models were found in the asset library (decision 1430). If no matching automation step models were found, then decision 1430 branches to the "no" branch whereupon, at step 1450, a new automation step model is created for the target cloud. On the other hand, if a matching automation step model was found, then decision 1430 branches to the "yes" branch whereupon the found automation step model is used. At step 1450, the automation step model (either found through the search or created in step 1440) is associated to the identified new or changed topology model unit. A determination is made as to whether there are more changed or new topology model units to process (decision 1460). If there are more changed or new topology model units to process, then decision 1460 branches to the "yes" branch which loops back to identify the next changed or new topology model unit and associate it with an automation step model as described above. Note that for changed model units, the Automation Step Model name used in the source cloud can be used in the search in order to find similar Automation Step Models for the target cloud. This looping continues until there are no more changed or new topology model units to process, at which point decision 1460 branches to the "no" branch.

At step 1470, deployment workflow model 1480 is generated for the target cloud. The workflow model is generated using the found or newly created automation step models associated with the identified new or changed topology model units as well as automation step models already associated with topology model units in the source topology model that were not changed in order to port the solution to the target cloud. Processing then returns to the calling routine (see FIG. 12) at 1395.

Figure 15:
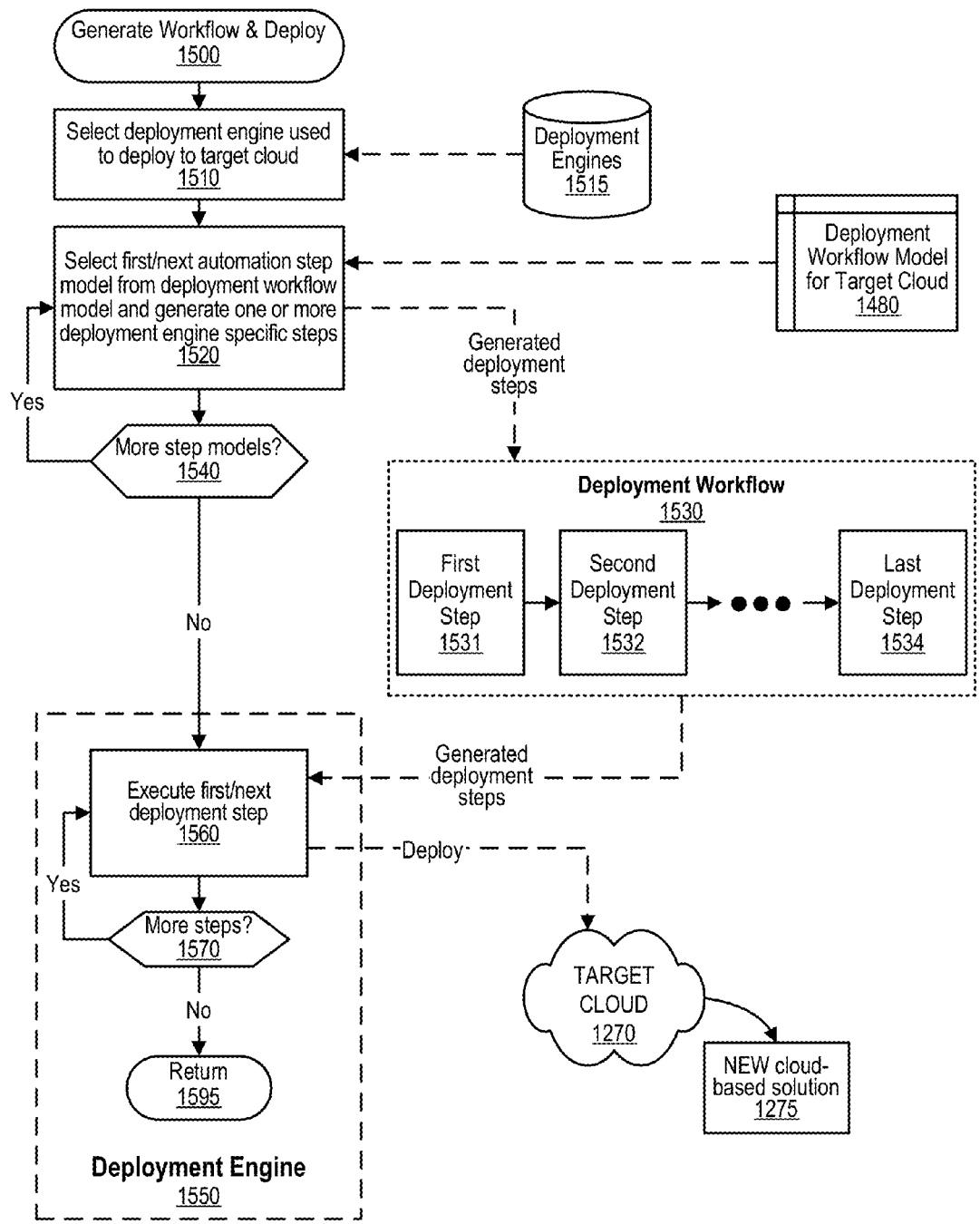
FIG. 15 is a flowchart showing steps taken to generate a deployment workflow from the model and deploy using a deployment engine according to an embodiment.

FIG. 15 is a flowchart showing steps taken to generate a deployment workflow from the model and deploy using a deployment engine according to an embodiment. FIG. 15 is called by predefined process 1250 shown in FIG. 12. Processing shown in FIG. 15 commences at 1500 whereupon, at step 1510, a deployment engine that will be used to deploy the solution to the target cloud is selected from deployment engines data store 1515. Some target clouds may use a particular deployment engine, while other general purpose deployment engines can also be used to deploy solutions to target clouds. The deployment engines may have different processing capabilities and characteristics that may make a particular deployment engine attractive for deploying a solution to a particular target cloud. At step 1520, the first deployment operation(s) is/are selected from deployment workflow model 1480 that was generated in FIG. 14. Each automation step model can include multiple deployment operations. These deployment operations are ordered sequentially in the workflow model. The deployment operations are also specific to the deployment engine. Each deployment operation is then used to generate a deployment engine specific step. Step 1520 generates one or more deployment engine 1515 specific steps that are capable of being executed by the selected deployment engine. The generated deployment engine specific steps are stored in deployment workflow 1530 as first deployment step 1531, second deployment step 1532, etc. until last deployment step 1534. A determination is made as to whether there are more deployment operations to process (decision 1540). If there are more step models to process, then decision 1540 branches to the "yes" branch which loops back to select the next automation step model from deployment workflow model 1480 and generate the deployment engine specific steps as described above at step 1520. This looping continues until there are no more deployment operations to process, at which point decision 1540 branches to the "no" branch whereupon selected deployment engine 1550 is called to process deployment workflow 1530. Deployment workflow 1530 includes the deployment operations, and is transmitted to selected deployment engine 1550 prior to calling.

Deployment engine processing commences by executing the first deployment step (step 1531) included in deployment workflow 1530. The execution of the first deployment step results in deployment of a portion of the solution to the target platform (target cloud 1270). A determination is made by one of the deployment engines 1515 as to whether there are more deployment steps to process (decision 1570). If there are more deployment steps to process, then decision 1570 branches to the "yes" branch which loops back to select and execute the next step (e.g., second deployment step 1532) from deployment workflow 1530 resulting in further deployment of the solution to the target platform. This looping continues until the last deployment step (last deployment step 1534) has been processed at step 1560, at which point decision 1570 branches to the "no" branch and processing returns at 1595. The result of executing all of the deployment steps is new cloud based solution 1275 running on the target platform (target cloud 1270).

Figure 16:
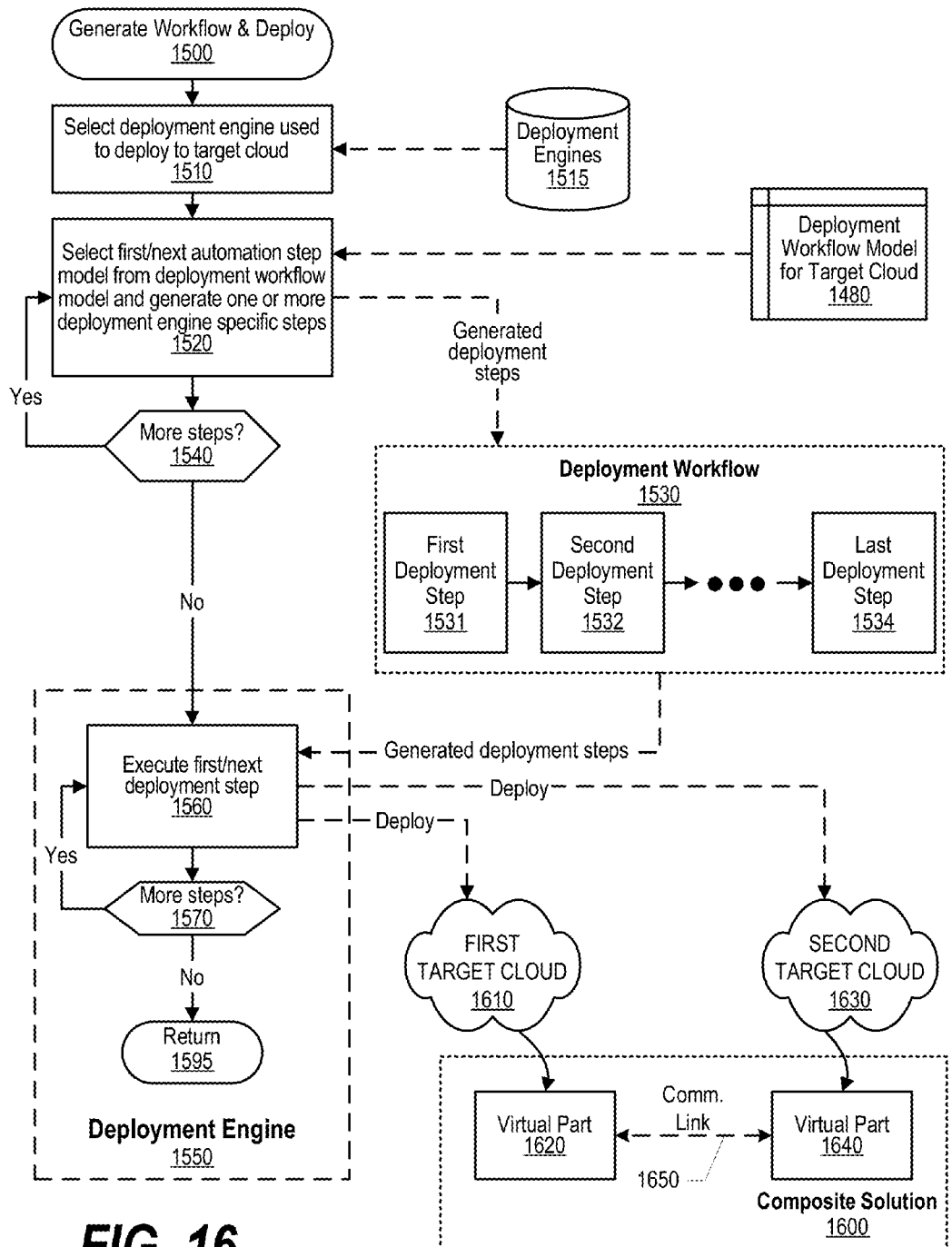
FIG. 16 is a flowchart showing steps taken to generate a deployment workflow from the model and deploy a composite solution to multiple cloud based environments according to an embodiment.

FIG. 16 is a flowchart showing steps taken to generate a deployment workflow from the model and deploy a composite solution to multiple cloud based environments according to an embodiment. The steps are the same as those shown and described in FIG. 15, however in FIG. 16, the deployment steps result in deploying the solution across two target platforms (first target cloud 1610 and second target cloud 1630) resulting in composite solution 1600. Each of the target clouds hosts a virtual part of the solution (virtual part 1620 hosted by first target cloud 1610 and virtual part 1640 hosted by second target cloud 1630). In addition, one or more of the deployment steps included in deployment workflow 1530 establish communication link 1650 between virtual part 1630 and virtual part 1640. Communication link 1650 can be established over a virtual private network (VPN). While two clouds and virtual parts are shown in composite solution 1600, any number of target clouds and virtual parts can be included in a composite solution with communication links established between any number of the virtual parts.

In an embodiment, a solution for the target cloud or hypervisor may be reconstructed using a model driven approach that may avoid i) copying of image contents and ii) representation of virtual image contents in a unified disk file format. Embodiments may allow a solution to be ported between different cloud (or hypervisor) providers with incompatible hardware architecture, hypervisor technology, type and version of the guest OS. Embodiments may also allow cloud-specific (or hypervisor-specific) configurations to be added while porting. Embodiments may also allow inclusion of virtual image parts in a composite solution for hybrid clouds that can be partially ported.

In an embodiment, differencing a source topology model associated with a source platform and a target topology model associated with a target platform resulting in a topology difference may be obtained and/or stored in patches using a tool such as Eclipse Modeling Framework (EMF) Compare Project. In an embodiment, a portion of the differencing is performed by at least one processor that may be selected from one or more processors. In an embodiment, topology model units may be constructed and/or visualized using Rational Software Architect on top of Eclipse. In an embodiment, automation step models may be constructed and/or visualized using Rational Software Architect on top of Eclipse. Rational Software Architect stores the model data in XML format. XML includes different sections for the different model units such as the virtual appliance, the middleware, the virtual image, the guest operating system, cloud specific configuration, application level communication links, and the like. Each XML section can include multiple deployment parameters such as software versions and types. The parameters in the virtual appliance section can be used as input in searches of the asset library for finding a compatible virtual image for the target cloud.

In an embodiment, obtaining an operation in a workflow model from an asset library may be obtained by searching Rational Asset Manager where automation step models which include the deployment operations may be stored. The search may use as input the metadata for the topology model unit associated with the automation step model. In an embodiment, a portion of the asset library may be stored in a persistent storage medium. In an embodiment, the entire asset library, including a portion of the asset library, may be stored in a persistent storage medium.

In an embodiment, executing the operation to deploy a portion of a solution, wherein the deployed portion of the solution includes a target image compatible with the target platform, may be executed using Tivoli Provisioning Manager as a deployment engine. In an embodiment, Tivoli Provisioning Manager may execute a workflow deploying different portions of the solution to different clouds or hypervisors.

Embodiments of methods, computer program products, and systems for porting a solution from a source platform to a target platform are disclosed. A difference between a set of model units in a source topology model and a set of model units in a target topology model is determined. The source topology model is associated with a source platform and the target topology model is associated with a target platform. An operation in a workflow model is obtained from an asset library by virtue of its association with the determined difference between the set of model units of the source topology model and the set of model units of the target topology model. The operation is transmitted. The operation is configured to deploy at least a portion of a solution that comprises a target image compatible with the target platform. Such embodiments may be used to port solutions between different infrastructure clouds or hypervisors supporting different hardware architecture, virtual image formats and programming interfaces. Such embodiments may also be used to reuse common solution components, configuration parameters, and deployment automation operations when porting solutions.

According to further disclosed embodiments, the source platform is a first set of hardware and software resources and the target platform is a second set of hardware and software resources. At least a portion of the solution is ported from the first set of hardware and software resources to the second set of hardware and software resources. Such embodiments may be used to port a solution from one cloud (or hypervisor or computer system) to another cloud (or hypervisor or computer system).

According to further disclosed embodiments, the source platform is a private set of hardware and software resources. The target platform is a public set of hardware and software resources. Such embodiments may be used to port a solution from a private cloud to a public cloud. Other embodiments may be used to port a solution from a public cloud to a private cloud, from a private cloud to a private cloud, and/or from a public cloud to a public cloud.

According to further disclosed embodiments, the solution is a composite solution. The second set of hardware and software resources comprises a plurality of sets of hardware and software resources. Such embodiments may be used to port different virtual parts of a solution to different clouds (or hypervisors or computer systems) comprising a hybrid cloud.

According to further disclosed embodiments, metadata stored in an asset library is searched for at least one base image metadata that is associated with the target platform. Such embodiments may be used to find compatible base virtual images for the target platform in which the solution's pre-requisite software components are preinstalled.

According to further disclosed embodiments, the source platform is a first hypervisor running on a first set of one or more computer systems. The target platform is a second hypervisor running on a second set of one or more computer systems. The first and second hypervisors are different types of hypervisors. Such embodiments may be used to port a solution from one hypervisor (or computer system) to another hypervisor (or computer system).

According to further disclosed embodiments, the determined difference comprises at least one of a new model unit, a changed model unit, or a removed model unit. Such embodiments may be used to reuse common solution components, configuration parameters, and deployment automation operations when porting solutions.

According to further disclosed embodiments, the determined difference further comprises identifying one or more attributes of the set of model units in the source topology model and identifying whether the identified attributes are incompatible with one or more identified attributes of the set of model units in the target topology. The determined difference may comprise identification of incompatible attributes (including type) in model units of the source topology model as compared to the target topology model. Such embodiments may be used to identify solution components, configuration parameters and deployment automation operations which need to change when porting solutions.

According to further disclosed embodiments, the identified incompatible attribute of the model unit is analyzed in response to identifying that the identified attributes are incompatible. The incompatible attribute of the model unit is modified in order to port the solution from the source platform to the target platform. Such embodiments may be used to determine changes to solution components, configuration parameters, and deployment automation operations for porting solutions; and may also be used to make the identified incompatible attributes in the model units compatible with the target platform topology model.

According to further disclosed embodiments, the identified incompatible attribute identifies whether a model unit has been removed, added or modified in the target topology when compared to the source topology model. Such embodiments may be used to identify solution components, configuration parameters and deployment automation operations which need to change when porting solutions.

According to further disclosed embodiments, the modification of the incompatible attribute further comprises, adding a new model unit, updating the model unit or removing the model unit in order to rectify the identified incompatibility between the set of model units of the source topology and the set of model units of the target topology. Such embodiments may be used to determine changes to solution components, configuration parameters and deployment automation operations for porting solutions.

According to further disclosed embodiments, a model unit comprises data that identifies one or more attributes of a topology model. Such embodiments may be used to determine configuration and deployment parameters for deploying a solution to a platform.

According to further disclosed embodiments, the source platform is a first hypervisor running on a first set of hardware resources and software resources. The target platform is a second hypervisor running on a second set of hardware and software resources. The source and target hypervisors are of different types. Such embodiments may be used to port a solution between virtual images compatible with different types of hypervisors.

Embodiments of methods, computer program products, and systems are provided that obtain a topology model unit that is to be deployed to a target platform. A plurality of automation step models stored in an asset library are searched for a selected automation step model that is associated with the received topology model unit. The searching is performed by one or more processors. One or more deployment operations are obtained from the asset library. The obtained deployment operations are associated with the selected automation step model. The obtained deployment operations are performed in order to deploy the topology model unit to the target platform. Such embodiments may be used to construct a new or changed workflow model for deploying a solution to a different platform.

Embodiments of methods, computer program products, and systems provide an approach that retrieve a source image metadata from a persistent storage media. The source image metadata corresponds to a source image associated with a source platform. The retrieved source metadata is compared to one or more available image metadata corresponding to one or more available images associated with a target platform. One of the available image metadata that is most compatible to the source image metadata is identified based on the comparison. The available image corresponding to the identified available image metadata is used as a target image compatible with the target platform. Such embodiments may be used to find compatible base virtual images for the target platform in which most (if not all) of the solution's prerequisite software components are preinstalled.

It is understood that there are various alternative embodiments. For example, in an embodiment, the invention provides a computer-readable/useable medium that includes computer program code to enable a computer infrastructure to provide the functionality as discussed herein. To this extent, the computer-readable/useable medium includes program code that implements each of the various processes. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In an embodiment, a method that performs the process on a subscription, advertising, and/or fee basis is provided. That is, a service provider, such as a Solution Integrator, could offer to provide the services described herein. In this case, the service provider can create, maintain, support, etc., a computer infrastructure, such as computer system 12 (FIG. 1) that performs the process for one or more customers. In return, the service provider can receive payment from the customer(s) under a subscription and/or fee agreement and/or the service provider can receive payment from the sale of advertising content to one or more third parties.

In an embodiment, a computer-implemented method for providing the functionality described herein is provided. In this case, a computer infrastructure, such as computer system 12 (FIG. 1), can be provided and one or more systems for performing the process can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process.

One of the described implementations is a software application, namely, a set of instructions (program code) or other computer program instructions in a code module that may, for example, be resident in the random access memory of the computer. Functional descriptive material includes "program code," "computer program code," "computer instructions," and any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing device, and the like. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the embodiments may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

An information handling system (data processing system) suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description has been presented for purposes of illustration and description. It is not intended to be exhaustive or to limiting as, obviously, many modifications and variations are possible. Such modifications and variations that may be apparent to a person skilled in the art are intended to be included within the scope of the disclosure as defined by the accompanying claims.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure.

Furthermore, it is to be understood that one or more embodiments are defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to limitations containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    differencing a source topology model associated with a source platform and a target topology model associated with a target platform, wherein the source platform is a first cloud and the target platform is a second cloud, the differencing resulting in a topology difference, wherein at least a portion of the differencing is performed by a processor, and wherein the differencing comprises:
    comparing a first set of model units corresponding to the source platform and a second set of model units corresponding to the target platform, wherein the comparing results in one or more changed model units and one or more common model units;
    retrieving a first set of automation step models from the source topology model that correspond to the common model units, wherein the first set of automation step models describe a first set of automation steps used to deploy the common model units;
    searching an asset library for the changed model units, the searching resulting in a second set of automation step models corresponding to the changed model units, wherein the second set of automation step models describe a second set of automation steps used to deploy the changed model units;
    obtaining an operation in a workflow model from the asset library, wherein the workflow model includes the first and second sets of automation step models, and wherein the operation is associated with the topology difference, and wherein at least a portion of the asset library is stored in a persistent storage medium; and
    transmitting the operation to deploy at least a portion of a solution, wherein the deployed portion of the solution includes a target virtual image compatible with the target platform.

2. The method of claim 1 further comprising:
    deploying the portion of the solution at the target platform by executing the operation.

3. The method of claim 2 wherein a result of the deploying includes a porting of the solution from the source platform to the target platform.

4. The method of claim 1 wherein the solution is a composite solution, and wherein the second cloud includes a plurality of clouds.

5. The method of claim 1 wherein the source platform is a private cloud, and wherein the target platform is a public cloud.

6. The method of claim 1 further comprising:
    searching metadata for at least one base virtual image metadata that is associated with the target platform.

7. The method of claim 6 further comprising:
    searching the metadata in one or more cloud-specific virtual image libraries.

8. The method of claim 6 further comprising:
    retrieving input parameters used in the searching, wherein the input parameters are provided by the target topology model.

9. The method of claim 6 further comprising:
    retrieving one or more base virtual image descriptions from the metadata stored in the asset library in response to the searching.

10. The method of claim 1 further comprising:
    associating the topology difference to the source topology model and the target topology model; and
    storing the topology difference and the associations in the asset library as a patch.

11. The method of claim 10 further comprising:
    receiving a second source topology model that is partially common to the source topology model and a second target platform that is partially common to the target platform;
    searching one or more patches, including the patch, in the asset library, wherein the search includes the associated source topology model;
    retrieving the patch from the asset library in response to the search; and applying the retrieved patch to the second source topology model resulting in a second target topology model that associated with the second target platform.

12. The method of claim 1 wherein the solution is a composite solution comprised of multiple virtual parts, wherein a virtual part is comprised of a model of a virtual image and its constituent guest OS, middleware and application model units, wherein each virtual part is deployed to a different target platform, and wherein each target platform corresponds to either a public cloud or a private cloud.

13. The method of claim 1 further comprising:
transmitting a plurality of operations, including the operation, to deploy a complete solution.

14. The method of claim 1 wherein the differencing results in an identification of one or more new units, wherein the new units are found in the target topology model and are not found in the source topology model, and wherein the method further comprises:
searching the asset library for the new units.

15. The method of claim 1 wherein the operation to deploy the portion of the solution enables the portion of the solution to be ported from one cloud vendor to another cloud vendor.

16. The method of claim 1 wherein the operation to deploy the portion of the solution sets a security firewall.

17. The method of claim 1 wherein the operation to deploy the portion of the solution instantiates the target virtual image in the target platform.

18. The method of claim 1 wherein the source platform is a first hypervisor running on a first set of one or more computer systems, wherein the target platform is a second hypervisor running on a second set of one or more computer systems, and wherein the first and second hypervisors are different types of hypervisors.

19. The method of claim 1 wherein the source and target topology models each include metadata describing one or more software application components, a middleware software application component, and a guest operating system component.

20. The method of claim 19 wherein the metadata included with the source and target topology models each further include one or more virtual image deployment parameters, wherein the source topology model includes source topology model units of source configuration parameters corresponding to the source cloud and source credentials and source service endpoints, wherein the target topology model includes target topology model units of target configuration parameters corresponding to the target cloud and target credentials and target service endpoints.

21. The method of claim 20 further comprising:
associating each of the source topology model units with a source automation step model that details one or more of the operations used to deploy the associated source topology model unit;
associating each of the target topology model units with a target automation step model that details one or more of the operations used to deploy the associated target topology model unit; and
storing each of the target automation step models in the workflow model.

22. The method of claim 1 wherein the performing the operation to deploy the portion of the solution enables multi-tenancy.

23. The method of claim 1 wherein the performing the operation to deploy the portion of the solution enables varying workloads.

* * * * *